United States Patent
Frye et al.

(10) Patent No.: US 8,805,349 B2
(45) Date of Patent: Aug. 12, 2014

(54) METHOD FOR CONTROLLING MOBILE COMMUNICATIONS

(75) Inventors: Mark S. Frye, Grosse Pointe Woods, MI (US); Michael B. Ames, Lake Orion, MI (US); Derek Hopper, Madison Heights, MI (US); Daniele Nicolini, Livonia, MI (US)

(73) Assignee: General Motors LLC, Detroit, MI (US)

( * ) Notice: Subject to any disclaimer, the term of this patent is extended or adjusted under 35 U.S.C. 154(b) by 421 days.

(21) Appl. No.: 13/197,609

(22) Filed: Aug. 3, 2011

(65) Prior Publication Data

US 2012/0282906 A1   Nov. 8, 2012

Related U.S. Application Data

(63) Continuation-in-part of application No. 13/100,858, filed on May 4, 2011, now Pat. No. 8,565,838.

(51) Int. Cl.
*H04M 3/00* (2006.01)
*H04M 1/00* (2006.01)

(52) U.S. Cl.
USPC ........................................ 455/418; 455/569.2

(58) Field of Classification Search
USPC ......... 455/418–420, 456.1–456.6, 41.1–41.3, 455/569.2
See application file for complete search history.

(56) References Cited

U.S. PATENT DOCUMENTS

| | | | |
|---|---|---|---|
| 6,396,925 B1 | 5/2002 | Close | |
| 7,668,309 B2 | 2/2010 | Wilcox et al. | |
| 7,835,730 B2 | 11/2010 | Boss et al. | |
| 7,873,351 B2 | 1/2011 | Yahagi | |
| 8,301,108 B2* | 10/2012 | Naboulsi | 455/345 |
| 8,315,617 B2* | 11/2012 | Tadayon et al. | 455/418 |
| 8,461,973 B2* | 6/2013 | Reed et al. | 340/425.5 |
| 8,502,642 B2* | 8/2013 | Vitito | 340/5.21 |
| 2002/0094079 A1 | 7/2002 | Edwards | |
| 2004/0086112 A1 | 5/2004 | Hilger et al. | |
| 2008/0014966 A1 | 1/2008 | Chakraborty et al. | |
| 2008/0051160 A1* | 2/2008 | Seil et al. | 455/575.1 |
| 2008/0275604 A1 | 11/2008 | Perry et al. | |
| 2010/0148920 A1 | 6/2010 | Philmon et al. | |
| 2011/0039581 A1 | 2/2011 | Cai et al. | |
| 2011/0275321 A1* | 11/2011 | Zhou et al. | 455/41.2 |
| 2011/0282564 A1* | 11/2011 | Park et al. | 701/117 |
| 2012/0006611 A1* | 1/2012 | Wallace et al. | 180/272 |
| 2012/0119873 A1* | 5/2012 | Ramsdell et al. | 340/4.3 |
| 2013/0012123 A1* | 1/2013 | DeLuca | 455/39 |

FOREIGN PATENT DOCUMENTS

WO   WO 97/42057   11/1997

OTHER PUBLICATIONS

U.S. Appl. No. 12/984,446, filed Jan. 4, 2011, Sumcad, et al.
U.S. Appl. No. 13/113,660, filed May 23, 2011, Olsen, et al.

* cited by examiner

*Primary Examiner* — Brandon Miller
(74) *Attorney, Agent, or Firm* — Dierker & Associates, P.C.

(57) ABSTRACT

A method for controlling mobile communications involves establishing an RFID connection between an RFID tag disposed on or at a predefined location inside a cabin area of a vehicle and an RFID reader attached to a mobile communications device. Upon breaking the RFID connection, an application resident on the device recognizes that the device is no located in the predefined location. A message is automatically sent to an entity outside of the vehicle, where the message indicates that the device is no longer located at the predefined location inside the vehicle.

23 Claims, 7 Drawing Sheets

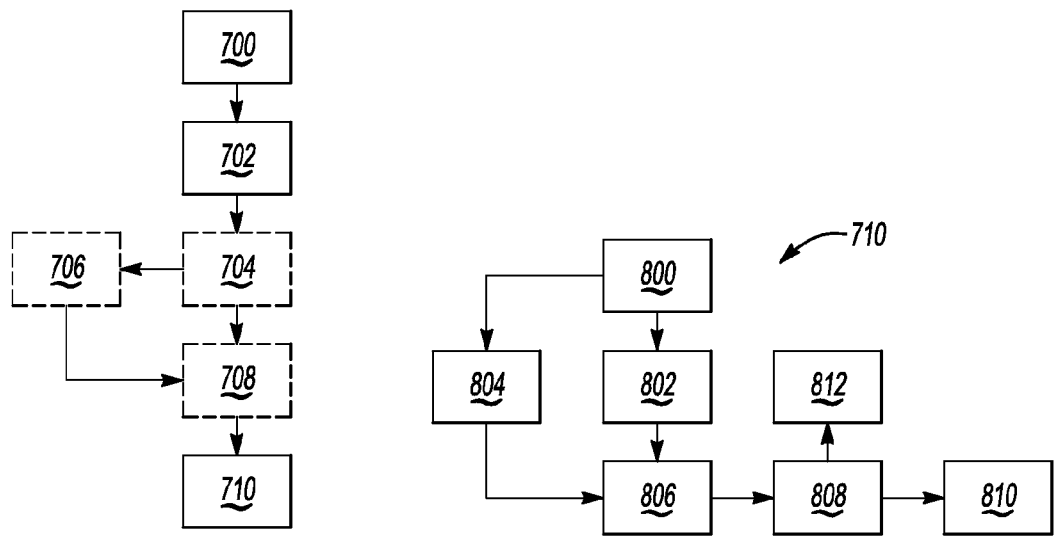
Fig-7
Fig-8
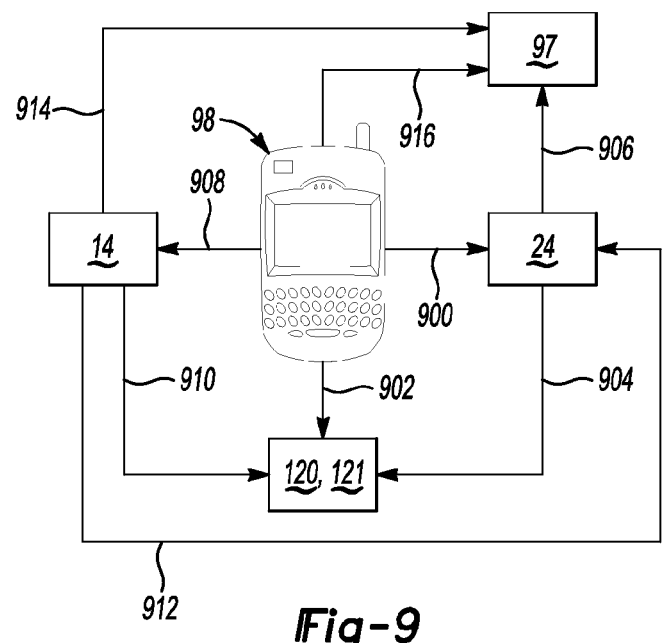
Fig-9

US 8,805,349 B2

METHOD FOR CONTROLLING MOBILE COMMUNICATIONS

CROSS REFERENCE TO RELATED APPLICATIONS

This application is a continuation-in-part of co-pending U.S. patent application Ser. No. 13/100,858, filed May 4, 2011, which is incorporated by reference herein in its entirety.

TECHNICAL FIELD

The present disclosure relates generally to methods for controlling mobile communications.

BACKGROUND

Cellular technology has enabled users of mobile communications devices to establish voice and/or data connections with other mobile devices and/or landline units. An example of a voice connection includes sending and/or receiving voice calls to/from another communications device. A data connection may include, for example, sending and/or receiving text messages, and this type of messaging is often referred to as "text messaging" or simply "texting".

Establishing voice and/or data connections via the mobile communications device typically requires at least some attention from the user. For instance, the use of at least one of the user's hands may be required to perform one or more tasks associated with texting. In some instances, the user may be engaged in another activity (such as when operating machinery) while attempting to establish a voice and/or data connection, and thus the user's attention may be diverted from the other activity.

SUMMARY

A method for controlling mobile communications involves establishing an RFID connection between i) an RFID tag operatively disposed on or at a predefined location inside a cabin area of a vehicle and ii) an RFID reader operatively attached to a mobile communications device. Upon breaking the RFID connection, the method further involves recognizing, via an application resident on the mobile communications device, that the mobile communications device is no longer located at the predetermined location inside the cabin area of the vehicle. A message is automatically sent to an entity outside of the vehicle, where the message indicates that the mobile communications device is no longer located at the predefined location inside the cabin area of the vehicle.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

FIGS. 7 and 8 are flow diagrams depicting examples of a method for controlling mobile communications; and FIG. 9 is a flow diagram depicting an example of a method for communicating a location of a mobile device inside a vehicle to an outside entity.

DETAILED DESCRIPTION

Figure 1:
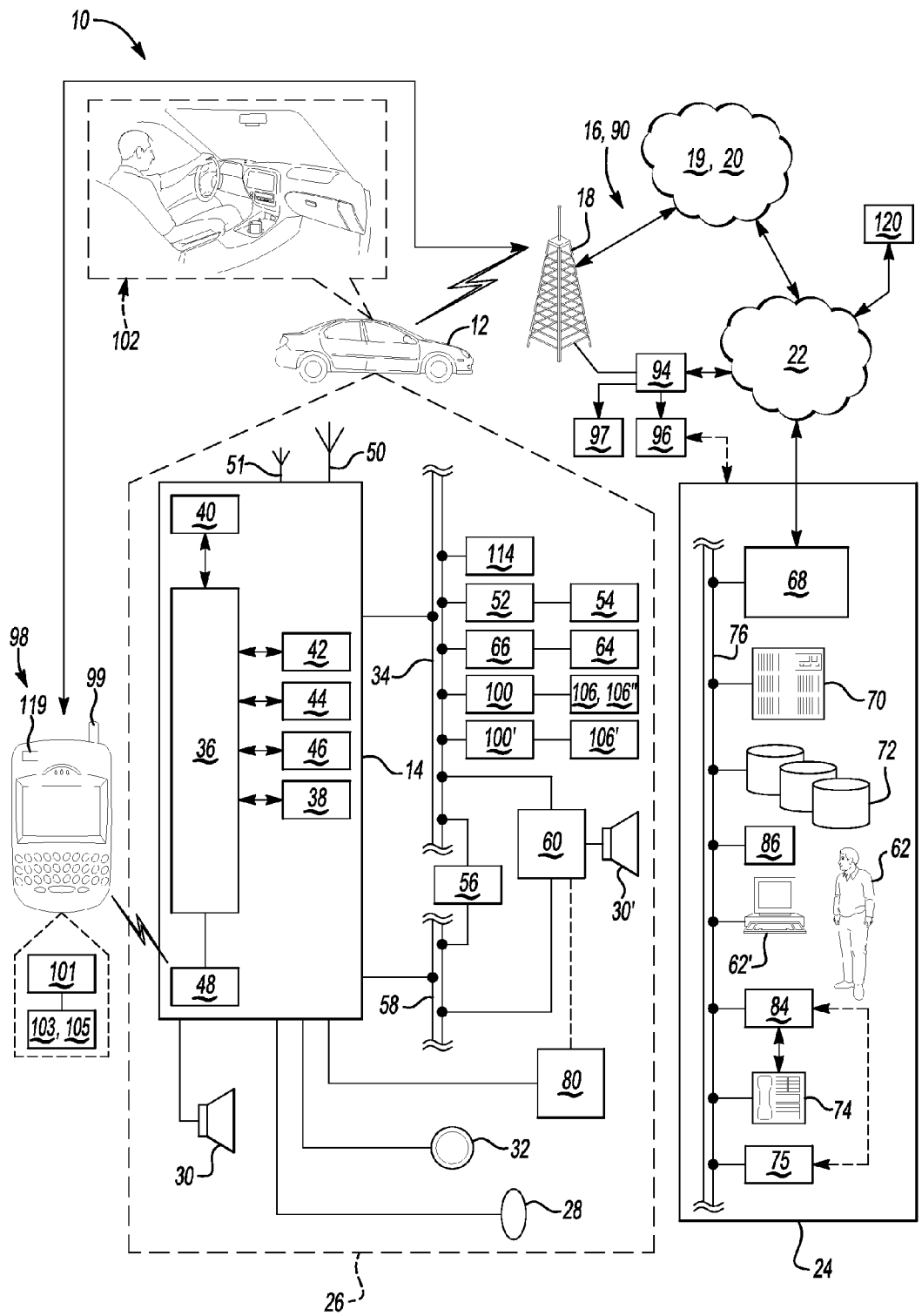
FIG. 1 is a schematic diagram depicting an example of a system for controlling mobile communications.

Many mobile vehicle drivers are in possession of a mobile communications device while driving. In some cases, the mobile device may be stowed in the driver's pocket, purse, briefcase, backpack, or the like while the driver is physically engaged in the driving activities of the vehicle. In instances where the driver receives an incoming call, the driver may attempt to remove the device from its stowed position (e.g., from inside the driver's pocket) and answer the call while simultaneously attempting to drive the vehicle. In other cases, the driver may place the mobile device somewhere inside the vehicle interior, such as in a compartment (e.g., a glove box), in a tray (e.g., one that may be defined in a center console between the driver and passenger seats), on a passenger seat, on the dashboard, or the like. Upon receiving an incoming call or text message while driving the vehicle, for example, the driver may attempt to retrieve the device from its current position and then, if the retrieval is successful, answer the call or read/answer the incoming text.

Examples of the methods disclosed herein may be used to discourage a driver from using his/her mobile communications device in a non-hands-free manner while operating a vehicle. The non-hands-free manner may include answering an incoming voice call by placing the phone adjacent the driver's ear, by typing a text message on a keypad, or by some other function that involves the user's hands. In some cases, the method discourages the driver from using the device in a manner requiring the use of the driver's hands by automatically adjusting a functionality of an audio component disposed inside the vehicle in response to recognizing, via a telematics unit, that the device is not located in or at a predefined location inside a cabin area of the vehicle. In other cases, the method discourages the driver from using the device in a manner requiring the use of the driver's hands by automatically sending a message from the device to an outside entity (such as, e.g., a cellular phone of the driver's parent, a calling or computing device associated with a public safety facility, such as a police station or a fire station, etc.) upon recognizing, via an application resident on the mobile device, that the device is not located in or at the predefined location inside the cabin area of the vehicle. The message sent to the outside entity contains information that may apprise the outside entity that the driver is then-currently using his/her device in a non-hands-free manner while driving.

The predefined location may be located anywhere inside the cabin area; and this location may, in an example, be capable of, or even specifically designed to hold the mobile device. The predefined location may be formed as an integral part of the cabin area of the vehicle (e.g., a cup holder, door pocket, glove box, etc.), or may be a removable article configured to receive the mobile device, and this article may be received in a predefined location inside the vehicle. In this example, the predefined location may be referred to herein as a "mobile device holder" or simply a "holder". In yet another example, the predefined location may be a component inside the cabin area of the vehicle that the mobile device may be connected to, such as, e.g., a charging port disposed on the dashboard, center console, or the like.

It is believed that by tracking the location of the device (e.g., by detecting when the device is no longer located at/in the predefined location (such as in the holder)), the vehicle driver is less likely to use the mobile device while concurrently operating (e.g., driving) the vehicle. It is further believed that the vehicle driver may find that the automatic adjustment to the functionality of the audio component or the message automatically sent to an outside entity, both of which were mentioned above, may be frustrating enough for the vehicle driver to prevent the driver from wanting to remove his/her mobile device from the predefined location while driving.

It is to be understood that the examples of the methods described herein may be used when the user is engaged in an activity other than one involving the mobile communications device. An example of such an activity includes driving a mobile vehicle. Other activities may also apply, such as operating other machinery, performing a physical activity, and/or any other activity that requires a user's attention. It is to be understood that the examples of the method involving adjusting the audio component may be applied for activities other than driving a mobile vehicle so long as the other activities utilize an audio component.

Additionally, the adjustment of the functionality of the audio component and/or the message automatically sent to an outside entity allows the user to focus on the activity that he/she is then-currently engaged in, at least in part because distractions that may be associated with use of the mobile device in a non-hands-free manner are reduced or even eliminated. In some cases, for example, each time the user removes the device from the predefined location (e.g., from the holder), the audio component is automatically adjusted until, for example, the user places the device back to the predefined location (e.g., back in the holder). Adjustments to the audio component may also be reversed via other means, which will be described in further detail below. In other cases, each time the user removes the device from the predefined location, a message is automatically sent to an entity outside of the vehicle. As previously mentioned, the user may find that the adjustments to the audio component and/or the automatic transmission of a message outside of the vehicle are such that the user is prevented from removing the mobile device from the holder while operating the vehicle. Accordingly, it is believed that the user may focus all of his/her attention on the activity that he/she is then-currently engaged in (such as driving a vehicle) rather than answering voice calls, reading and responding to incoming text messages, and/or the like.

Further, the examples of the methods disclosed herein are particularly useful for activities that occur while the user (and thus the mobile communications device) is located inside a mobile vehicle. In one example method, upon pairing the mobile device with the telematics unit of the vehicle (which may be accomplished as soon as the mobile device is inside the vehicle and/or within short range wireless communication range with the telematics unit for the first time), and thereafter each time the paired mobile device is connected to the telematics unit (which may be accomplished each time the paired mobile device is within short range wireless communication range with the telematics unit), the adjustment of the functionality of the audio component may be accomplished on command by an in-vehicle telematics unit upon detecting that the mobile device is not located in or at a predefined location inside the vehicle. When this detection occurs, the telematics unit communicates with the audio component, and controls the functionality of the audio component so that the user can focus his/her attention, e.g., on driving rather than on using his/her mobile device. In another example method, upon breaking a radio frequency identification (RFID) connection previously established between an RFID tag on or at the predefined location inside the vehicle and an RFID reader attached to the mobile device, the device is configured (via, e.g., an application resident thereon) to automatically send a message to an outside entity that indicates, for instance, that the device is no longer located at/in the predefined location. In some instances, upon breaking the RFID connection, the method further involves automatically adjusting a functionality of the mobile device and/or automatically establishing a short range wireless connection with an in-vehicle telematics unit to control or modify one or more vehicle components and/or vehicle systems. Details of the respective example methods mentioned herein will be described further below.

As used herein, the term "user" includes any person in possession of a mobile communications device, and who is engaged in an activity (e.g., driving a mobile vehicle) while in possession of the device. The "user" may, in an example, be a vehicle owner, a vehicle driver, and/or a vehicle passenger. In instances where the user is the vehicle owner, the term "user" may be used interchangeably with the term subscriber/service subscriber. In some of the examples of the methods disclosed below, the user has his/her own personal webpage upon which information may be posted, and may further have his/her own mobile communications device.

Further, a "member" refers to a person or entity who/that has been invited by the user of a networking page, to access and view the networking page, and such person or entity has accepted the user's invitation. A member may also refer to a person or entity that has invited the user to be part of a networking group, and the user has accepted the invitation. It is to be understood that the networking page is generally associated with a host server. As used herein, a "host server" refers to a processor or computer upon which information of a website resides. In some of the examples disclosed herein, the website is a networking website, examples of which include a professional and/or social networking site. Non-limiting examples of networking sites include FACEBOOK™, TWITTER™, LINKEDIN®, and MYSPACE®. It is to be understood that the term "member" may be used interchangeably with the term "friend".

Furthermore, the term "post", as used herein, may be used as a noun that refers to a message (such as, e.g., a data message, a picture, a video, etc.) that is uploaded or posted onto the host server of the website hosting the user's personal webpage.

Additionally, the term "communication" is to be construed to include all forms of communication, including direct and indirect communication. Indirect communication may include communication between two components with additional component(s) located therebetween.

Still further, the terms "connect/connected/connection" and/or the like are broadly defined herein to encompass a variety of divergent connected arrangements and assembly techniques. These arrangements and techniques include, but are not limited to (1) the direct communication between one component and another component with no intervening components therebetween; and (2) the communication of one component and another component with one or more components therebetween, provided that the one component being "connected to" the other component is somehow in operative communication with the other component (notwithstanding the presence of one or more additional components therebetween).

FIG. 1 described in detail below depicts a system (identified by reference numeral 10) for controlling mobile communications while a user of the device (identified by reference numeral 98) is engaged in operating a mobile vehicle (identified by reference numeral 12). For purposes of the instant disclosure, the mobile communications device 98 may be selected from any mobile device capable of receiving and sending voice calls and/or text messages (such as SMS or MMS messages) and/or e-mails, etc. Examples of the mobile device include a mobile cellular phone, a smart phone, or the like. For some examples, the mobile device is chosen from one that is capable of executing an application stored in the memory 105 operatively associated therewith.

As mentioned above, the example methods are particularly useful for activities that occur involving a mobile vehicle 12 (such as driving the vehicle 12). This is due, at least in part, to the fact that the example methods may utilize a vehicle dedicated communications device (i.e., a telematics unit, identified by reference numeral 14). For instance, one of the methods involves utilizing the telematics unit 14 to control the functionality of an audio component operatively disposed inside the vehicle 12 upon detecting that the mobile device 98 has been removed from a predefined location inside a vehicle cabin area. It is to be understood, however, that the example methods disclosed herein are not to be limited to activities that involve a vehicle 12, and that a skilled artisan will know how to modify the teachings of the instant disclosure in order to apply the method while the user is engaged in the other activity. For instance, the methods may be applied when the user is engaged in operating construction equipment. However, in some examples, the method may be applied so long as the construction equipment has associated therewith a communications device that can pair with the mobile device 98 and an audio component having a functionality that may be adjusted on command from the communications device.

The system 10 depicted in FIG. 1 generally includes the mobile vehicle 12, the telematics unit 14 operatively disposed in the mobile vehicle 12, a carrier/communication system 16 (including, but not limited to, one or more cell towers 18, one or more base stations 19 and/or mobile switching centers (MSCs) 20, and one or more service providers (e.g., 90) including mobile network operator(s)), one or more land networks 22, and one or more telematics service/call centers 24. In an example, the carrier/communication system 16 is a two-way radio frequency communication system, and may be configured with a web service supporting system-to-system communications (e.g., communications between the call center 24 and the service provider 90).

For purposes of illustration, the system 10 will be described below using a car as the mobile vehicle 12, and this vehicle 12 includes a number of vehicle systems that contribute to the overall operation of the vehicle 12. An example of such a vehicle system includes a vehicle ignition system (not shown), which may be used to power on the vehicle 12, for example, by turning an ignition key, pressing an ignition button inside the vehicle 12 or on vehicle key fob, or the like. Another example of a vehicle system includes a transmission system (also not shown) that is responsible for the mobility of the vehicle 12. The vehicle transmission system utilizes a transmission shifting lever to switch between various operational modes of the vehicle 12, such as between a drive mode, a park mode, a reverse mode, etc. The transmission may be manual or automatic, and while in the drive mode, the transmission system may be changed (either manually or automatically based on the type of transmission system) between various gears (e.g., first gear, second gear, etc.). In an example, the vehicle transmission system may have associated therewith its own processor (not shown in FIG. 1), which sends signals to the telematics unit 14 using a data link when the operational mode of the vehicle transmission system changes (e.g., from the drive mode into park mode, etc.) or when a gear of the transmission system changes (e.g., from first gear to second gear, etc.). The transmission system processor may be operatively connected to the telematics unit 14 via a vehicle bus 34, which is described further hereinbelow.

The wireless carrier/communication system 16 may be used to establish communication between a mobile communications device 98 and the telematics unit 14. For example, a user of the device 98 (e.g., when outside of the vehicle 12) may call the telematics unit 14 over the wireless carrier/communication system 16. However, when the device 98 is located within close proximity (i.e., a distance suitable for short range wireless communication) of the telematics unit 14, communication between the mobile device 98 and the telematics unit 14 may be established via short range wireless connection (e.g., by pairing the telematics unit 14 and the mobile device 98 using a BLUETOOTH® or the like). In one example, the mobile device 98 is in close proximity of the telematics unit 14 when the mobile device 98 is inside the passenger compartment (i.e., the cabin area) of the mobile vehicle 12. Further details of pairing the mobile device 98 with the telematics unit 14 will be provided below.

In an example, the carrier/communication system 16 also includes a host server 94 including suitable computer equipment (not shown) upon which information of a remotely accessible page 96 resides/is stored. For instance, the remotely accessible page 96 is a webpage set up and maintained by the network provider 90 or by a telematics service provider, and the user may access the page 96 by, e.g., submitting personal information (e.g., a login ID) and authenticating information (e.g., a password, a PIN, etc.). The computer equipment used to log into the page 96 may also include hardware which, for example, can receive and read a smart card for identification/authentication purposes, or can utilize biometrics for identification/authentication purposes.

In an example, the computer equipment of the host server 94 may further have stored therein other remotely accessible pages, such as a user's personal webpage 97. This personal webpage 97, for example, may be associated with one or more networking websites, such as FACEBOOK™, TWITTER™, LINKEDIN®, etc., or may be a user's telematics service site and/or account managing site associated with the telematics call center 24. In one example, the webpage 97 is a networking page set up and maintained by the user, for instance, and the webpage 97 is hosted by the networking website. While, in this example, the webpage 97 is discussed as being a personal webpage of the user, it is to be understood that the webpage 97 may be run and owned by the entity operating the networking website. It is to be understood, however, that the webpage 97 may also be run and owned by the user who operates his/her own networking site. In this case, the site is stored on a user-owned host server rather than the host server 94.

The overall architecture, setup and operation, as well as many of the individual components of the system 10 shown in FIG. 1 are generally known in the art. Thus, the following paragraphs provide a brief overview of one example of the system 10. It is to be understood, however, that additional components and/or other systems not shown here could employ the method(s) disclosed herein.

Figure 2:
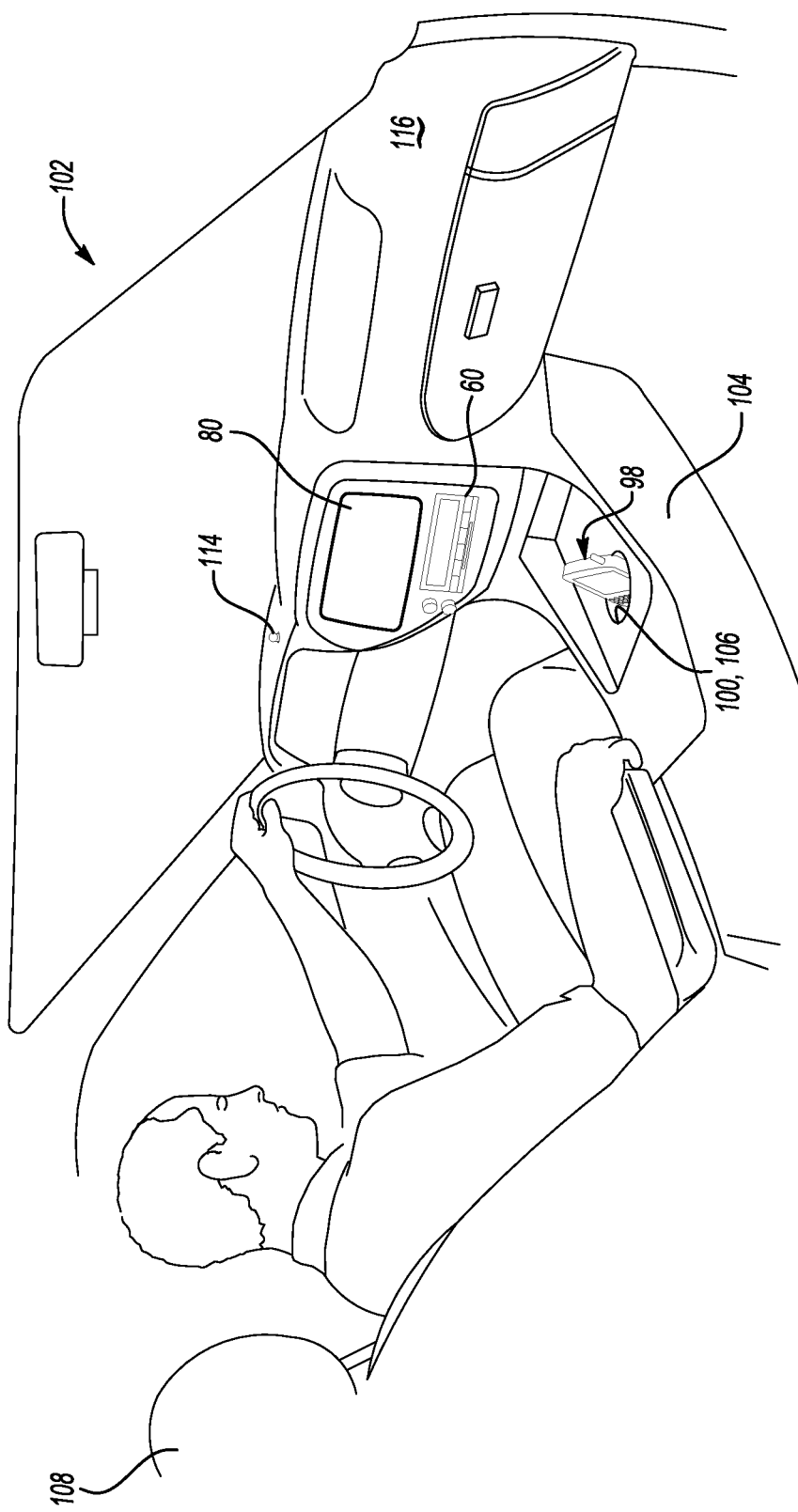
FIG. 2 semi-schematically depicts an example of a cabin area of a vehicle showing a mobile communications device that is then-currently positioned inside an example of a predefined location in the cabin area of the vehicle.

Vehicle 12 may be a mobile land vehicle, such as a motorcycle, car, truck, recreational vehicle (RV), plane, boat, etc., and is equipped with suitable hardware and software that enables it to communicate (e.g., transmit and/or receive voice and data communications) over the carrier/communication system 16. For the example methods described herein, the vehicle 12 is an automobile including an interior cabin area 102, within which a vehicle driver (and possibly one or more passengers) reside(s) while the vehicle 12 is in operation. As shown in FIGS. 2 through 6, the cabin area 102 includes at least a driver seat 108, a passenger seat (not shown), and a center console 104 positioned between them. The cabin area 102 includes several locations where the mobile device 98 may be stowed while the driver is operating the vehicle 12. In an example, one of these locations may be selected (e.g., by the vehicle manufacturer) as a predefined location where the mobile device 98 should be stowed while the vehicle 12 is being operated. In the example shown in FIG. 2, the predefined location is a receptacle 100 defined in the center console 104, and this receptacle 100 may be configured to receive the device 98. In this example, the receptacle 100 alone may be referred to as a mobile device holder, and this holder is the predefined location inside the vehicle 12. The receptacle/holder 100 may be, for instance, an opening previously formed in the center console 104 which is configured to receive the mobile device 98 directly. The opening may be in the form of a slot, and may be shaped to receive any type of device 98. The opening may otherwise be rounded (as shown in FIG. 2) or may be rectangular-shaped including sharp corners (e.g., right angled corners, or some other desired angled corners), rounded corners, or combinations of both. Additionally, the holder 100 may be about the size of the largest known mobile communications device, such as, e.g., the Motorola DROID or the Apple iPHONE®. Thus, the entire mobile device 98 may be consumed by/surrounded by the wall(s) of the holder 100 when the device 98 is placed therein.

It is also contemplated that the holder 100 may be a separate receptacle that fits into a pre-existing opening inside the vehicle 12, such as a vehicle door storage pocket, a tray formed in the center console 104, an ash tray, a cup holder, and/or the like. In one example, the separate receptacle fits inside a cup holder that may be defined, for instance, in the center console 104 of the vehicle 12. The separate receptacle may have any shape formed from the connection of two opposed sides (e.g., a quasi pear shape formed from two integral or joined side walls), a triangular shape (formed from, e.g., three side walls), a quadrilateral shape (formed from, e.g., four side walls), as well as any shape formed from e.g., five or more side walls. In one example, the shape of the receptacle is dictated by the opening for which it is designed.

Figure 3:
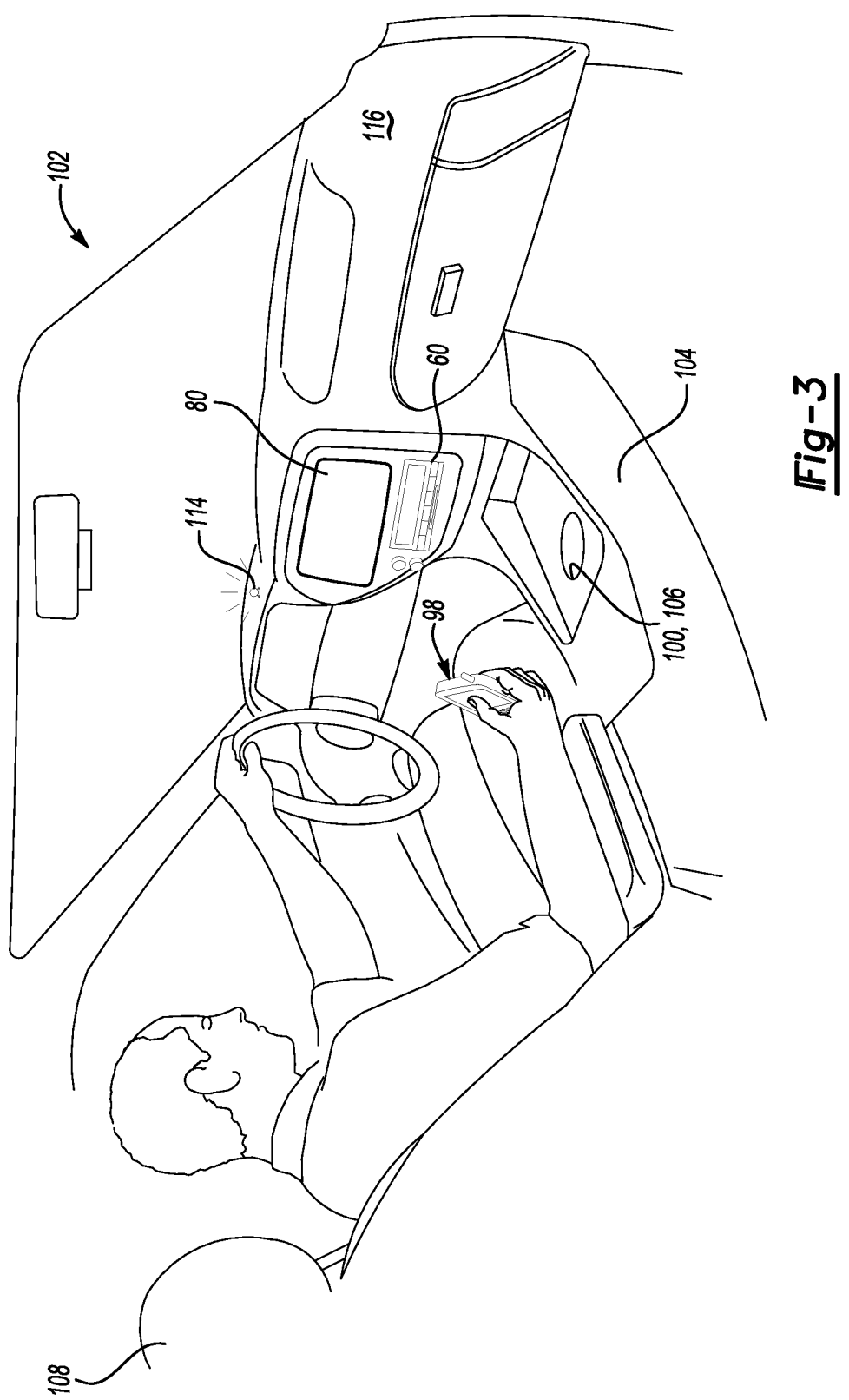
FIG. 3 semi-schematically depicts an example of a cabin area of a vehicle showing the mobile communications device not located in the example of the predefined location depicted in FIG. 2.

In the example shown in FIG. 2, the holder 100 includes a detector (not visually shown in FIG. 2, but identified by reference numeral 106) operatively connected thereto. This detector 106 may be, in one example, a mechanical switch that is configured to be activated when the mobile device 98 is not positioned inside the holder 100. In an example, the mechanical switch may include two contacts that form a circuit when the device 98 is disposed inside the holder 100, and the circuit is open when the device 98 has been removed from the holder 100 (as shown in FIG. 3). The switch 106 detects that the device 98 is not in the holder as soon as the circuit is opened. Upon detecting that the mobile device 98 is not located in the holder 100, the detector 106 transmits a signal to the telematics unit 14 (via the bus 34, which is described in further detail below) indicating that the device 98 is not located in the holder 100.

Figure 4:
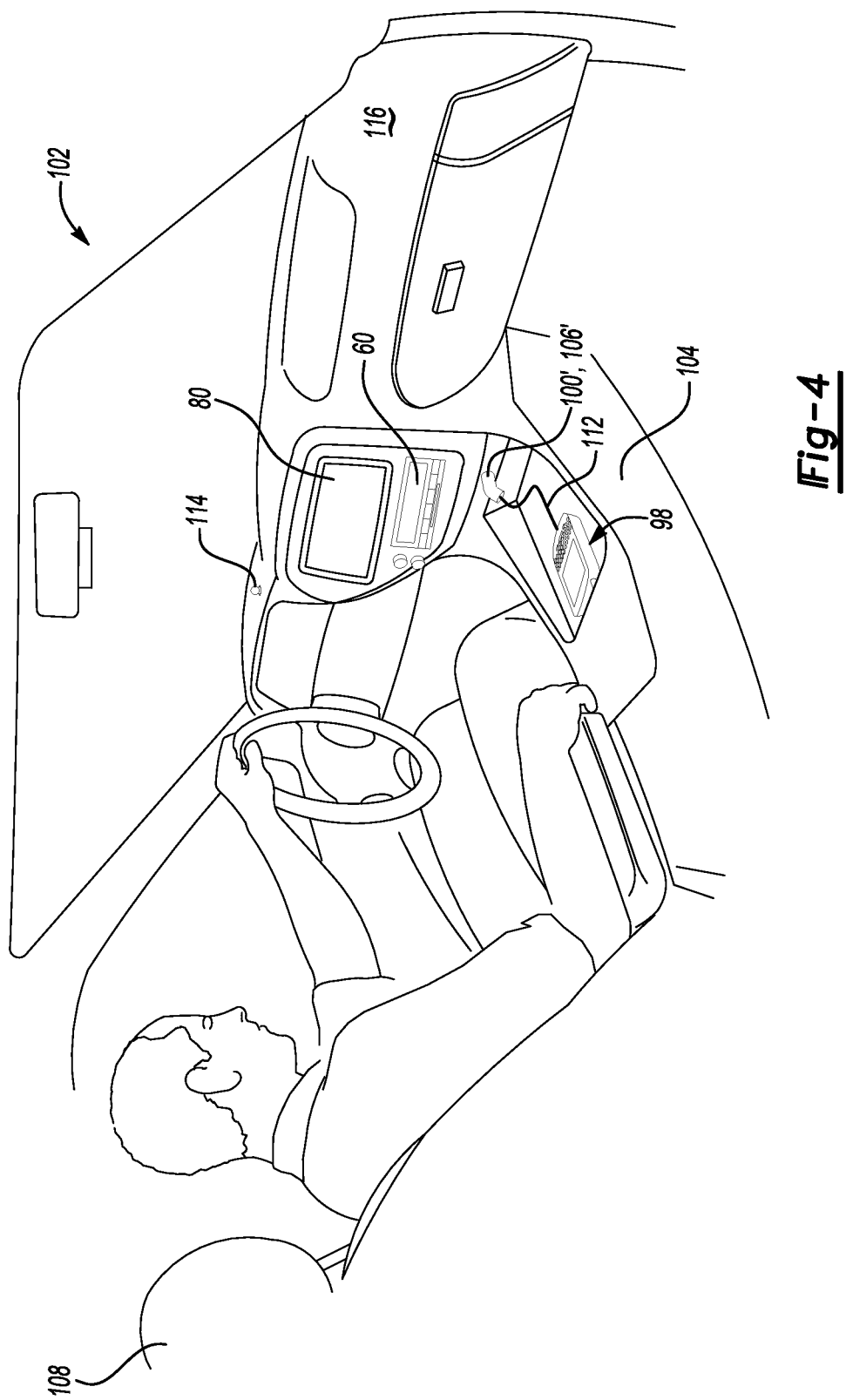
FIGS. 4, 5, and 6 semi-schematically depict examples of a cabin area of a vehicle showing the mobile communications device located in other examples of a predefined location in the cabin area of the vehicle.

In another example, as shown in FIG. 4, the predefined location may be a port 100' formed, for instance, on the dashboard 116 of the vehicle 12. This port 100' may be configured to receive a charging dongle 112 connected to the mobile device 98 in order to supply power to, or charge a battery of the device 98. In an example, the charging dongle 112 is a USB cable, and the port is a USB port configured to receive the USB cable. In this example, the port 100' may also have a detector 106' operatively connected thereto that is activated when the charging dongle 112 has been disconnected from the port 100'. When activated, the detector 106' transmits a signal to the telematics unit 14 (via the bus 34) indicating that the device 98 is not located in the predefined location.

Other examples of the predefined location and the detector 106, 106' that may be utilized to detect when the mobile device 98 is no longer located at/in the predefined location will be described in detail below (e.g., in reference to FIGS. 5 and 6).

Referring back to FIG. 1, some of the vehicle hardware 26 is generally shown, including the telematics unit 14 and other components that are operatively connected to the telematics unit 14. Examples of other hardware 26 components include a microphone 28, a speaker 30 and buttons, knobs, switches, keyboards, and/or controls 32. Generally, these hardware 26 components enable a user to communicate with the telematics unit 14 and any other system 10 components in communication with the telematics unit 14. It is to be understood that the vehicle 12 may also include additional components suitable for use in, or in connection with, the telematics unit 14.

Operatively coupled to the telematics unit 14 is a network connection or vehicle bus 34, as mentioned above. Examples of suitable network connections include a controller area network (CAN), a media oriented system transfer (MOST), a local interconnection network (LIN), an Ethernet, and other appropriate connections, such as those that conform with known ISO, SAE, and IEEE standards and specifications, to name a few. The vehicle bus 34 enables the vehicle 12 to send and receive signals from the telematics unit 14 to various units of equipment and systems both outside the vehicle 12 and within the vehicle 12 to perform various functions, such as unlocking a door, executing personal comfort settings, and/or the like.

The telematics unit 14 is an onboard vehicle dedicated communications device. In an example, the telematics unit 14 is linked to the call center 24 via the carrier system 16, and is capable of calling and transmitting data to the call center 24.

The telematics unit 14 provides a variety of services, both individually and through its communication with the call center 24. The telematics unit 14 generally includes an electronic processing device 36 operatively coupled to one or more types of electronic memory 38, a cellular chipset/component 40, a wireless modem 42, a navigation unit containing a location detection (e.g., global positioning system (GPS)) chipset/component 44, a real-time clock (RTC) 46, a short-range wireless communication network 48 (e.g., a BLUETOOTH® unit), and/or a dual antenna 50. In one example, the wireless modem 42 includes a computer program and/or set of software routines (i.e., computer readable instructions embedded on a non-transitory tangible medium) executing within processing device 36.

As mentioned above, the short range wireless communication 48 (e.g., the BLUETOOTH® unit) may be used to connect the mobile device 98 with the telematics unit 14 once the devices 14, 98 have been paired. In an example, the telematics unit continuously monitors for the presence of the mobile device 98 using a short range wireless antenna 51, and attempts to connect with the device 98 upon recognizing the presence of the mobile device 98. In another example, the mobile device 98 continuously monitors for the presence of the telematics unit 14 using its own short range wireless antenna 99. The mobile device 98 attempts to connect with the telematics unit 14 upon recognizing the presence of the telematics unit 14; which typically occurs as soon as the mobile device 98 is placed within the short range wireless range of the telematics unit 14. The mobile device 98 or the telematics unit 14 alone may be configured to monitor for the presence of the other device, or both of the devices 14, 98 may be configured to monitor for the presence of the other device at the same time.

It is to be understood that the mobile device 98 and the telematics unit 14 attempt to connect during each encounter between the devices 98, 14 after the devices 14, 98 have been paired. The mobile device 98 and the telematics unit 14 are actually paired when the telematics unit 14 and the mobile device 98 exchange security codes/passwords with each other. This enables the telematics unit 14 and the mobile device 98 to communicate typically under a secured connection. As a more specific example, pairing may involve setting the mobile device 98 to a short range wireless discovery mode (such as by selecting, on the device 98, a discovery mode function as a menu option, icon, or the like). While in the discovery mode, other devices having a short range wireless communication system (such as the telematics unit 14) are allowed to detect the presence of the mobile device 98. When the telematics unit 14 locates the device 98, the device 98 automatically provides the type of device it is (e.g., a cellular phone) and its short range wireless connection name. This short range wireless connection name may, for instance, be selected by the user or provided by the manufacturer of the device 98. The device 98 may then prompt the user to enter a security code/password, and this security code/password is sent to the telematics unit 14. Upon receiving the security code/password, the telematics unit 14 sends its own security code/password to the device 98 to ultimately pair the two devices 14, 98 together.

Once the two units 14, 98 have been paired and whenever within short range wireless communication range of each other, the telematics unit 14 can directly communicate with the mobile device 98, and voice communications received at the mobile device 98 are transmitted to the user hands-free via the telematics unit 14.

In some cases, the telematics unit 14 may be directly involved in controlling the mobile device 98. This may be accomplished after a short range wireless connection has been established between the devices 14, 98. For instance, the telematics unit 14 may submit a command to the mobile device 98 to adjust a functionality of the device 98. The command may be processed via a processor (not shown, but labeled 101) operatively disposed in the mobile device 98. More specifically, the processor 101 executes an application 103 stored in a memory 105 of the mobile device 98 in response to the command, where the application 103 is specifically designed to adjust the functionality of the device 98. It is to be understood that the application is further designed to re-adjust the functionality back into its original, default state (if previously adjusted) in response to another command received from the telematics unit 14.

The telematics unit 14 may also or otherwise be directly involved in controlling an operational mode of the vehicle 12 upon receiving a notification (in the form of, e.g., a signal), from the mobile device 98, that the mobile device 98 has been placed in the predefined location 100 (e.g., upon establishing an RFID connection between the RFID reader of the mobile device 98 and the RFID tag on/at the predefined location inside the vehicle 12) or is no longer placed in the predefined location 100 (e.g., upon breaking the previously established RFID connection between the RFID reader and the RFID tag). Upon receiving the signal, the processor 36 associated with the telematics unit 14 is configured to activate an appropriate preset operational mode of the vehicle 12.

It is to be understood that the telematics unit 14 may be implemented without one or more of the above listed components (e.g., the real time clock 46), except in the examples disclosed herein, the telematics unit 14 includes the short range wireless network 48. It is to be further understood that telematics unit 14 may also include additional components and functionality as desired for a particular end use.

The electronic processing device 36 of the telematics unit 14 may be a micro controller, a controller, a microprocessor, a host processor, and/or a vehicle communications processor. In another example, electronic processing device 36 may be an application specific integrated circuit (ASIC). Alternatively, electronic processing device 36 may be a processor working in conjunction with a central processing unit (CPU) performing the function of a general-purpose processor. The electronic processing device 36 (also referred to herein as a processor) may, for example, include software programs having computer readable code to initiate and/or perform various functions of the telematics unit 14, as well as computer readable code for performing various steps of the examples of the method disclosed herein. For instance, the processor 36 may include software programs that include computer readable code/instructions encoded on a computer readable medium for recognizing that the mobile communications device 98 is not located in or at the predefined location inside a cabin area 102 of the vehicle 12, and for generating a command to be transmitted to an in-vehicle audio component 60 (e.g., via the bus 34) to adjust the functionality of the audio component 60. The processor 36 also includes other software programs that include computer readable code encoded on the computer readable medium for initiating the transmission of a command to the mobile device 98 to adjust a functionality thereof and/or for activating a preset operational mode of the vehicle 12. The software program may also contain other computer readable code for initiating a transmission of another command to the mobile device 98 to re-adjust the functionality back to its default state and/or to de-activate the preset operational mode in response to a trigger, such as upon detecting, via the telematics unit 14, that the vehicle 12 is stopped, parked, and/or placed into an ignition OFF state (e.g., by powering off the vehicle 12).

Still referring to FIG. 1, the location detection chipset/component 44 may include a Global Position System (GPS) receiver, a radio triangulation system, a dead reckoning position system, and/or combinations thereof. In particular, a GPS receiver provides accurate time and latitude and longitude coordinates of the vehicle 12 responsive to a GPS broadcast signal received from a GPS satellite constellation (not shown).

The cellular chipset/component 40 may be an analog, digital, dual-mode, dual-band, multi-mode and/or multi-band cellular phone. Basically, the cellular chipset 40 is a semiconductor engine that enables the telematics unit 14 to connect with other devices some suitable type of wireless technology. The cellular chipset/component 40 uses one or more prescribed frequencies in the 800 MHz analog band or in the 800 MHz, 900 MHz, 1900 MHz and higher digital cellular bands. In some cases, the cellular chipset/component 40 may also use a frequency below 800 MHz such as 700 MHz or lower. In yet other cases, the cellular chipset/component 40 may use a frequency above 2600 MHz. Any suitable protocol may be used, including digital transmission technologies, such as TDMA (time division multiple access), CDMA (code division multiple access), GSM (global system for mobile telecommunications), and LTE (long term evolution). In some instances, the protocol may be short-range wireless communication technologies, such as BLUETOOTH®, dedicated short-range communications (DSRC), or Wi-Fi. In other instances, the protocol is Evolution Data Optimized (EVDO) Rev B (3G) or Long Term Evolution (LTE) (4G).

Also associated with electronic processing device 36 is the previously mentioned real time clock (RTC) 46, which provides accurate date and time information to the telematics unit 14 hardware and software components that may require and/or request date and time information. In an example, the RTC 46 may provide date and time information periodically, such as, for example, every ten milliseconds.

The electronic memory 38 of the telematics unit 14 may be configured to store data associated with the various systems of the vehicle 12, vehicle operations, vehicle user preferences and/or personal information, and the like. The user preferences (e.g., user-selected adjustments to user-selected functionalities of the mobile device 98, user-selected (i.e., preset) operational modes of the vehicle 12 upon identifying the driver of the vehicle 12 and upon detecting that the driver's mobile device is not located in a predefined location inside the vehicle 12 while the vehicle 12 is in operation, etc.) and/or personal information (e.g., the subscriber's name, garage address, billing address, home phone number, cellular phone number, etc.) may be stored in a user profile, created by the user upon setting up his/her account with the telematics service provider. The profile may be created by accessing the remotely accessible page 96 and selecting and/or inputting his/her preferences, by calling the call center 24 and speaking with a service advisor 62, 62', etc. The user profile may also include user-selected services in addition to the user-selected preferences and personal information.

The telematics unit 14 provides numerous services alone or in conjunction with the call center 24, some of which may not be listed herein, and is configured to fulfill one or more user or subscriber requests. Several examples of these services include, but are not limited to: turn-by-turn directions and other navigation-related services provided in conjunction with the GPS based chipset/component 44; airbag deployment notification and other emergency or roadside assistance-related services provided in connection with various crash and or collision sensor interface modules 52 and sensors 54 located throughout the vehicle 12; and infotainment-related services where music, Web pages, movies, television programs, videogames and/or other content is downloaded by an infotainment center 56 operatively connected to the telematics unit 14 via vehicle bus 34 and audio bus 58. In one example, downloaded content is stored (e.g., in memory 38) for current or later playback.

Again, the above-listed services are by no means an exhaustive list of all the capabilities of telematics unit 14, but are simply an illustration of some of the services that the telematics unit 14 is capable of offering. It is to be understood that when these services are obtained from the call center 24, the telematics unit 14 is considered to be operating in a telematics service mode.

Vehicle communications generally utilize radio transmissions to establish a voice channel with carrier system 16 such that both voice and data transmissions may be sent and received over the voice channel. Vehicle communications are enabled via the cellular chipset/component 40 for voice communications and the wireless modem 42 for data transmission. In order to enable successful data transmission over the voice channel, wireless modem 42 applies some type of encoding or modulation to convert the digital data so that it can communicate through a vocoder or speech codec incorporated in the cellular chipset/component 40. It is to be understood that any suitable encoding or modulation technique that provides an acceptable data rate and bit error may be used with the examples disclosed herein. In one example, an Evolution Data Optimized (EVDO) Rev B (3G) system (which offers a data rate of about 14.7 Mbit/s) or a Long Term Evolution (LTE) (4G) system (which offers a data rate of up to about 1 Gbit/s) may be used. These systems permit the transmission of both voice and data simultaneously. Generally, dual mode antenna 50 services the location detection chipset/component 44 and the cellular chipset/component 40.

The microphone 28 provides the user with a means for inputting verbal or other auditory commands, and can be equipped with an embedded voice processing unit utilizing human/machine interface (HMI) technology known in the art. Conversely, speaker(s) 30, 30' provide verbal output to the vehicle occupants and can be either a stand-alone speaker 30 specifically dedicated for use with the telematics unit 14 or can be part of a vehicle audio component 60, such as speaker 30'. In either event and as previously mentioned, microphone 28 and speaker(s) 30, 30' enable vehicle hardware 26 and telematics service call center 24 to communicate with the occupants through audible speech. The vehicle hardware 26 also includes one or more buttons, knobs, switches, keyboards, and/or controls 32 for enabling a vehicle occupant to activate or engage one or more of the vehicle hardware components. In one example, one of the buttons 32 may be an electronic pushbutton used to initiate voice communication with the telematics service provider call center 24 (whether it be a live advisor 62 or an automated call response system 62') to request services, to initiate a voice call to another mobile communications device, etc.

The audio component 60 is operatively connected to the vehicle bus 34 and the audio bus 58. The audio component 60 receives analog information, rendering it as sound, via the audio bus 58. Digital information is received via the vehicle bus 34. The audio component 60 provides AM and FM radio, satellite radio, CD, DVD, multimedia and other like functionality independent of the infotainment center 56. Audio component 60 may contain a speaker system (e.g., speaker 30'), or may utilize speaker 30 via arbitration on vehicle bus 34 and/or audio bus 58. In an example, the audio component 60 includes a number of different functions that may be adjusted on command by the telematics unit 14 upon recognizing that the mobile device 98 is not located in/at a predefined location (e.g., inside the holder 100 or unplugged from the port 100') inside the vehicle 12. The audio component 60 may be adjusted, for instance, by muting, fading, or otherwise scrambling an output (e.g., a song) that is then-currently being played or output from the audio component 60 over, e.g., the speaker 30'. In instances where the audio component 60 is muted or faded, the audio component 60 may be configured to play an audible warning message to the vehicle user. Further details of the warning message will be described below. The audio component 60 may otherwise be adjusted by playing an alert tone (e.g., a beep, a tone, etc.) through the speaker 30'.

Still referring to FIG. 1, the vehicle crash and/or collision detection sensor interface 52 is/are operatively connected to the vehicle bus 34. The crash sensors 54 provide information to the telematics unit 14 via the crash and/or collision detection sensor interface 52 regarding the severity of a vehicle collision, such as the angle of impact and the amount of force sustained.

Other vehicle sensors 64, connected to various sensor interface modules 66 are operatively connected to the vehicle bus 34. Example vehicle sensors 64 include, but are not limited to, gyroscopes, accelerometers, speed sensors, magnetometers, emission detection and/or control sensors, environmental detection sensors, and/or the like. One or more of the sensors 64 enumerated above may be used to obtain vehicle data for use by the telematics unit 14 or the call center 24 (when transmitted thereto from the telematics unit 14) to determine the operation of the vehicle 12. Example sensor interface modules 66 include powertrain control, climate control, body control, and/or the like.

In an example, each of the vehicle sensors 64 is associated with its own processor (not shown), which may include computer program(s) for obtaining information from the sensors 64 and either utilizing them to perform various vehicle functions and/or to send the information (e.g., as signals) to another processor in the vehicle 12 (e.g., the processor 36) to be utilized in other computer program(s). For instance, the speed sensor may be associated with its own processor which obtains speed signals from the speed sensor and transmits those signals to the processor 36 of the telematics unit 14 via the bus 34. The processor 36 may utilize the speed signals to establish a trigger that ultimately activates the application 103 stored on the mobile device 98. The trigger may be, e.g., when the vehicle 12 is physically in motion (i.e., the vehicle speed is greater than zero) or when the vehicle 12 has reached a predefined vehicle speed.

The vehicle hardware 26 includes the display 80, which may be operatively directly connected to or in communication with the telematics unit 14, or may be part of the audio component 60. The display 80 may be any human-machine interface (HMI) disposed within the vehicle 12 that includes audio, visual, haptic, etc. The display 80 may, in some instances, be controlled by or in network communication with the audio component 60, or may be independent of the audio component 60. Examples of the display 80 include a VFD (Vacuum Fluorescent Display), an LED (Light Emitting Diode) display, a driver information center display, a radio display, an arbitrary text device, a heads-up display (HUD), an LCD (Liquid Crystal Diode) display, and/or the like. In an example, the display 80 may be configured to display a text-based warning message to the vehicle user in response to a command initiated by the telematics unit 14 upon recognizing that the mobile device 98 is not located in/at the predefined location (e.g., holder 100, 100') inside the vehicle 12.

In an example, the vehicle 12 may also include a warning light 114 operatively disposed on a surface inside the cabin area 102 of the vehicle 12 that is within the field of view of the vehicle driver. In the examples shown in FIGS. 2-6, the warning light 114 is disposed on the dashboard 116, and (as shown in FIG. 1) is in communication with the telematics unit 14 via the bus 34. The warning light 114 may be activated (e.g., may blink) on command by the telematics unit 14, for example, when or after the functionality of the audio component 60 has been adjusted and/or when or after a message has been sent to an entity outside of the vehicle 12.

In some examples, the detector (not shown, but referred to by reference numeral 106" in FIG. 5) is an RFID reader that is operatively disposed inside the vehicle interior 102 at or near the predefined location 100. The RFID reader 106" utilizes radio frequency identification technology which uses radio waves to transfer data between a reader and an electronic tag (i.e., an RFID tag) attached to an object for the general purpose of identification and/or tracking. The RFID reader 106" may be a device separate from, but attached to the predefined location 100, or may be incorporated into the predefined location 100. The RFID reader 106" generally contains hardware powered by the vehicle battery (e.g., if incorporated into the vehicle 12) or powered by its own battery (e.g., if separate from, but attached to the vehicle 12). Further, in this example, the RFID reader 106" is a fixed reader, where the reader has an interrogation zone (also referred to as a reading area or an RFID connection range) defined by a predefined radius or bubble surrounding the reader 106". The size of the interrogation zone is determined, at least in part, by its energy source, and thus by the amount of RFID energy generated by the reader 106". The interrogation zone may, for instance, include a distance ranging about 12 cm to about 25 cm in any direction from the reader 106", and the RFID reader 106" may operate having an RFID energy of about 900 MHz.

Figure 5:
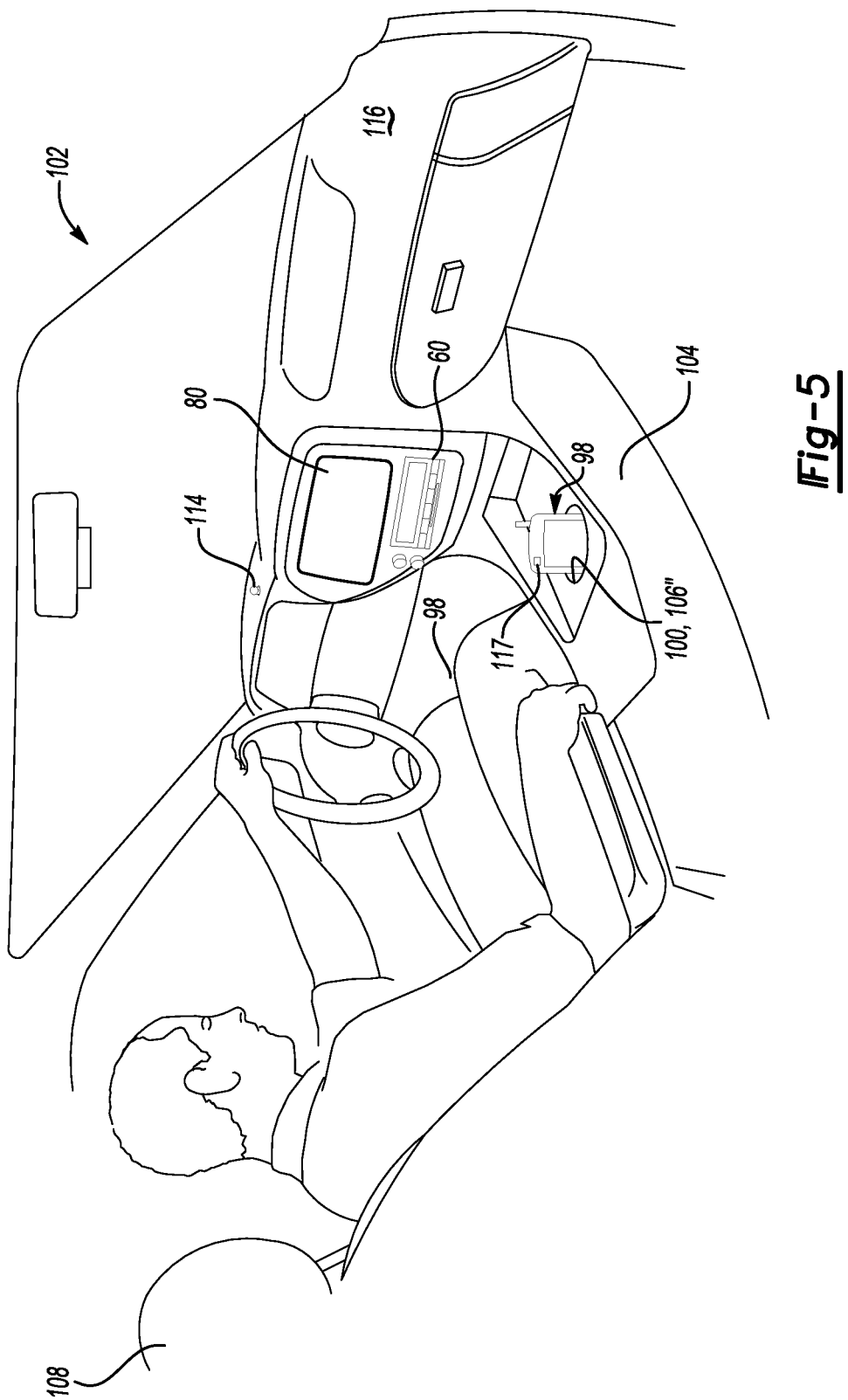

In the example shown in FIG. 5, the RFID reader 106" is configured to establish an RFID connection with the RFID tag (identified by reference numeral 117) which may be disposed on the mobile device 98. The RFID tag 117 may be composed of an integrated circuit for storing and processing information (such as information identifying the vehicle 12, e.g., its vehicle identification number (VIN)), for modulating and demodulating the radio frequency (RF) signal, and for other specialized functions. The tag 117 further includes an antenna for receiving and transmitting the signal to the reader 106". As such, an RFID connection is established when the RFID reader 106" receives the signal from the RFID tag 117 when the tag 117 (which may be part of the mobile device 98) is placed within the RFID interrogation zone (i.e., within the RFID connection range or reading area). Further, this connection may be broken upon separating the reader 106" from the tag 117, which may be accomplished by moving the mobile device 98 (and thus the tag 117, which is attached to the device 98) to a position outside of the interrogation zone. Upon breaking the connection, the reader 106" (which, in the example is associated with FIG. 5, also acts as a detector) automatically transmits a signal to the telematics unit 14 (e.g., via the bus 34) indicating that the RFID connection has been broken and that the mobile device 98 is no longer located in or at the predefined location.

Figure 6:
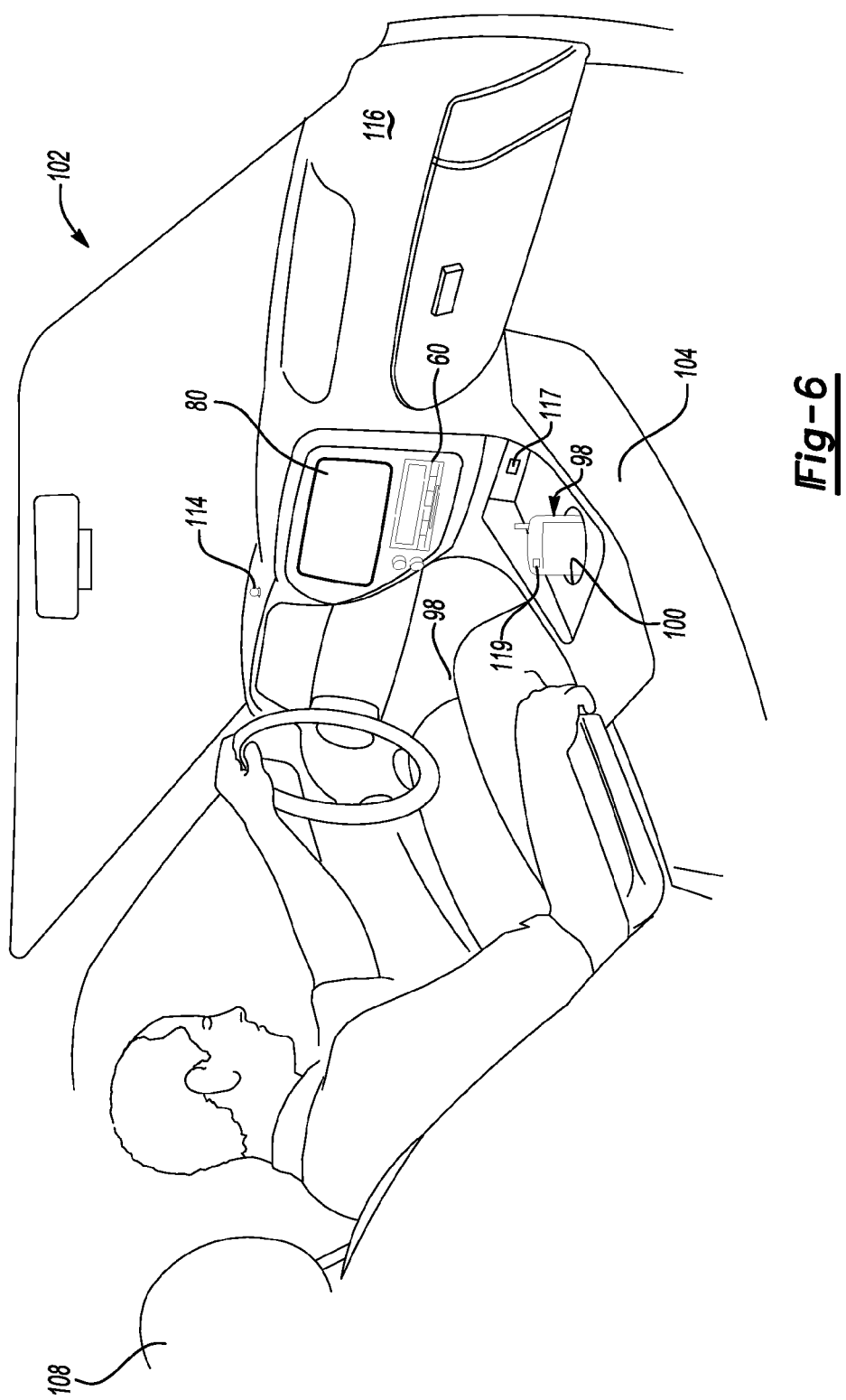

In another example, as shown in FIG. 6, the RFID tag 117 is attached to a surface defined inside the vehicle interior 102 at or near the predefined location 100. For instance, the RFID tag 117 may be directly attached to the mobile device holder 100 so long as the holder itself is physically attached to (i.e., not removable from) the vehicle interior 102. An RFID reader 119 is operatively attached to the mobile device 98, and may be, in this example, referred to as a mobile reader. It is to be understood that the interrogation zone defined around the mobile reader is the same as that for the fixed reader (shown as reference numeral 106" in FIG. 5), except that the positioning of the interrogation zone changes based on the positioning of the mobile device 98. Further, the RFID reader 119 may be a device separate from, but physically attached to the mobile device 98, or may be incorporated into the mobile device 98. An RFID connection may be established when the mobile device 98 (which has the RFID reader 119 attached thereto) is placed in a position inside the vehicle interior 102 such that the RFID tag 117 attached to a surface inside the vehicle interior 102 falls within the interrogation zone. This RFID connection may be broken, for instance, when the mobile device 98 is moved away from the tag 117 such that the tag 117 is no longer inside the interrogation zone.

As mentioned above, the system 10 includes the carrier/communication system 16. A portion of the carrier/communication system 16 may be a cellular telephone system or any other suitable wireless system that transmits signals between the vehicle hardware 26 and land network 22. According to an example, the wireless portion of the carrier/communication system 16 includes one or more cell towers 18, base stations 19 and/or mobile switching centers (MSCs) 20, as well as any other networking components required to connect the wireless portion of the system 16 with land network 22. It is to be understood that various cell tower/base station/MSC arrangements are possible and could be used with the wireless portion of the system 16. For example, a base station 19 and a cell tower 18 may be co-located at the same site or they could be remotely located, or a single base station 19 may be coupled to various cell towers 18, or various base stations 19 could be coupled with a single MSC 20. A speech codec or vocoder may also be incorporated in one or more of the base stations 19, but depending on the particular architecture of the wireless network 16, it could be incorporated within an MSC 20 or some other network components as well.

Land network 22 may be a conventional land-based telecommunications network that is connected to one or more landline telephones and connects the wireless portion of the carrier/communication network 16 to the call/data center 24. For example, land network 22 may include a public switched telephone network (PSTN) and/or an Internet protocol (IP) network. It is to be understood that one or more segments of the land network 22 may be implemented in the form of a standard wired network, a fiber or other optical network, a cable network, other wireless networks, such as wireless local networks (WLANs) or networks providing broadband wireless access (BWA), or any combination thereof.

The call centers 24 of the telematics service provider (also referred to herein as a service center) are designed to provide the vehicle hardware 26 with a number of different system back-end functions. According to the example shown in FIG. 1, one call center 24 generally includes one or more switches 68, servers 70, databases 72, live and/or automated advisors 62, 62', processing equipment (or processor) 84, a communications module 86, a data aggregator 75, as well as a variety of other telecommunication and computer equipment 74 that is known to those skilled in the art. These various telematics service provider components are coupled to one another via a network connection or bus 76, such as one similar to the vehicle bus 34 previously described in connection with the vehicle hardware 26.

The processor 84, which is often used in conjunction with the computer equipment 74, is generally equipped with suitable software and/or programs enabling the processor 84 to accomplish a variety of service center 24 functions. Further, the various operations of the service center 24 are carried out by one or more computers (e.g., computer equipment 74) programmed to carry out some of the tasks of the service center 24. The computer equipment 74 (including computers) may include a network of servers (including server 70) coupled to both locally stored and remote databases (e.g., database 72) of any information processed.

The databases 72 may be designed to store subscriber profile records, subscriber behavioral patterns, or any other pertinent subscriber information. In an example, the databases 72 may be configured to also store the user profile.

Switch 68, which may be a private branch exchange (PBX) switch, routes incoming signals so that voice transmissions are usually sent to either the live advisor 62 or the automated response system 62', and data transmissions are passed on to a modem or other piece of equipment (not shown) for demodulation and further signal processing. The modem preferably includes an encoder, as previously explained, and can be connected to various devices such as the server 70 and database 72.

Additionally, for some examples of the instant disclosure, the call center 24 is in selective and operative communication with the telematics unit 14 and host server 94, and may be configured to post a message onto the user's personal webpage 97. In an example, the call center 24 further includes a data aggregator 75 which is embodied at the call center 24 as a data aggregation module. The data aggregator 75 may be in selective and operative communication with the telematics unit 14 and/or the mobile communications device 98 via the communication system 16, and may, in some instances, receive and bin data included in the data message(s) generated as a result of detecting that an RFID connection between the RFID reader 119 attached to the mobile device 98 and the RFID tag 117 attached to the vehicle 12 has been established and/or has been broken. The data aggregator 75 may otherwise be operatively connected to the communication module 86 at the call center 24 (via, e.g., the bus 76), and is configured to receive and bin the data contained in the message(s) upon receiving it/them from the communications module 86. In these instances, the data aggregator 75 may simply be a data repository. In other instances, the data aggregator 75 is also capable of running computer readable code/software routines for receiving and processing the data contained in the message(s), e.g., to determine how to format the data and/or where to report the data. For instance, upon processing the data, the data aggregator 75 may re-format the data (which may be in a machine-readable form upon receiving the data) into a human-readable form, and, e.g., post the re-formatted data onto the user's personal webpage 97. In instances where the data aggregator 75 is simply a data repository, re-formatting of the data may otherwise be accomplished via a computer software program run by the processor 84 at the call center 24, which retrieves the data from the data aggregator 75, re-formats the data, and, e.g., posts the re-formatted data onto the user's personal webpage 97.

In another example, the data aggregator 75 (in instances where it includes its own processor) or the processor 84 may further contain computer readable code for reporting (i.e., communicating) the received data to another entity (such as, e.g., the mobile device of the driver's parent(s)). The reporting of the data may be accomplished via a wireless connection, a landline, the Internet, a short message service message, and/or the like. In an example, the data aggregator 75 (or the processor 84) further includes suitable computer readable code for filtering the data and/or for performing data conditioning processes to place such data in form for transmission to the other entity.

The communications module 86 is configured, via suitable communications equipment (such as equipment capable of handling messaging between the call center 24 and the telematics unit 14 (e.g., VehComm), modems, TCP/IP supporting equipment, and/or the like), to enable the call center 24 to establish a communication with the telematics unit 14, the mobile device 98, or vice versa. The communications module 86 is capable of receiving message(s) (i.e., packet data) from the telematics unit 14 and/or the mobile device 98, identifying the mobile device 98 that may be/is being controlled, and transmitting the message(s) to the data aggregator 75. The data aggregator 75 may run computer readable code/software routines that can receive the data, determine where to the send the data to, and one of i) transmit the data to the proper location, ii) upload the data as a post on the host server 94 of the user's personal webpage 97, or iii) store the data for internal call center 24 use. The stored data may be used, e.g., to determine a history of the usage of the mobile device 98 by the driver while operating the mobile vehicle 12.

It is to be appreciated that the service center 24 may be any central or remote facility, manned or unmanned, mobile or fixed, to or from which it is desirable to exchange voice and data communications. As such, the live advisor 62 may be physically present at the service center 24 or may be located remote from the service center 24 while communicating therethrough.

The communications network provider 90 generally owns and/or operates the carrier/communication system 16. The communications network provider 90 includes a mobile network operator that monitors and maintains the operation of the communications network 90. The network operator directs and routes calls, and troubleshoots hardware (cables, routers, network switches, hubs, network adaptors), software, and transmission problems. It is to be understood that, although the communications network provider 90 may have back-end equipment, employees, etc. located at the telematics service provider service center 24, the telematics service provider is a separate and distinct entity from the network provider 90. In an example, the equipment, employees, etc. of the communications network provider 90 are located remote from the service center 24. The communications network provider 90 provides the user with telephone and/or Internet services, while the telematics service provider provides a variety of telematics-related services (such as, for example, those discussed hereinabove). The communications network provider 90 may interact with the service center 24 to provide services (such as emergency services) to the user.

While not shown in FIG. 1, it is to be understood that in some instances, the telematics service provider operates a data center, which receives voice or data calls, analyzes the request associated with the voice or data call, and transfers the call to an application specific call center associated with the telematics service provider. It is further to be understood that the application specific call center may include all of the components of the data center, but is a dedicated facility for addressing specific requests, needs, etc. Examples of application specific call centers include, but are not limited to, emergency services call centers, navigation route call centers, in-vehicle function call centers, or the like.

The call center 24 components shown in FIG. 1 may also be virtualized and configured in a Cloud Computer, that is, Internet-based computing environment. For example, the computer equipment 74 may be accessed as a Cloud platform service, or PaaS (Platform as a Service), utilizing Cloud infrastructure rather than hosting computer equipment 74 at the call center 24. The database 72 and server 70 may also be virtualized as a Cloud resource. The Cloud infrastructure, known as IaaS (Infrastructure as a Service) typically utilizes a platform virtualization environment as a service, which may include components such as the processor 84, database 72, server 70, and computer equipment 74. In an example, application software and services (such as, e.g., navigation route generation and subsequent delivery to the vehicle 12) may be performed in the Cloud via the SaaS (Software as a Service). Subscribers, in this fashion, may access software applications remotely via the Cloud. Further, subscriber service requests may be acted upon by the automated advisor 62', which may be configured as a service present in the Cloud.

Examples of one of the methods for controlling mobile communications will be described in conjunction with FIGS. 1 through 5, while examples of another method for controlling mobile communications will be described in conjunction with FIGS. 1 and 6. It is to be understood that, in any of these examples, the controlling of the mobile device 98 is accomplished while the mobile device 98 is located inside a mobile vehicle (such as the vehicle 12).

One method for controlling mobile communications involves at least adjusting a functionality of the audio component 60 disposed inside the vehicle 12 upon recognizing that a mobile communications device 98 (which is associated with a vehicle operator, driver, or user) is not located in/at a predefined location (such as in the holder 100 or connected to a port 100') inside the cabin area 102 of the vehicle 12. Details of the examples of this method will now be described herein.

Before mobile communications may be controlled, in an example, the mobile device 98 may be associated with the telematics unit 14. This may be accomplished by registering both the telematics unit 14 and the mobile device 98 with the call center 24, and examples of the registration process are described hereinbelow. It is to be understood that the mobile device 98 and the telematics unit 14 may be paired upon registering, or prior to registering the devices 14, 98, and thus the mobile device 98 may connect with the telematics unit 14 (via, e.g., a BLUETOOTH® connection) whenever the device 98 is within a short range wireless distance from the telematics unit 14.

In an example, registering may be accomplished by accessing (via, e.g., a computer station having Internet access capabilities) the remotely accessible page (or webpage) 96 and submitting, into a login screen on the webpage 96, an acceptable login and password (or identifying and authenticating information). Once the webpage 96 has been accessed, the person accessing the webpage 96 (which is typically an authorized user of the vehicle 12) may select (e.g., by selecting a menu option or an icon displayed on the webpage 96 screen) a program configured to associate the mobile device 98 with the telematics unit 14. In some cases, associating the mobile device 98 with the telematics unit 14 is the same as enrolling the mobile device 98 in a program for selectively controlling, via the telematics unit 14, the functionality of the audio component 60 based on the location of the device 98 inside the vehicle cabin area 102 while the vehicle 12 is in operation. In an example, the user may access a user profile through the webpage 96, which typically includes information pertaining to the user and the user's vehicle 12. In many cases, the user profile will also include identification information of the in-vehicle telematics unit 14 (e.g., its serial number and the mobile dialing number (MDN), and perhaps any mobile devices that have already been paired (via, e.g., a BLUETOOTH® connection) with the telematics unit 14). In these cases, the user submits identification information of the mobile device 98 (e.g., its serial number, phone number, short range wireless security information, etc.), and indicates (e.g., via a mouse click on an appropriate icon or menu option on the webpage 96) to associate the two devices 14, 98. In cases where the telematics unit 14 is not identified in the user's profile, the user may submit both identification information of the telematics unit 14 and identification information of the mobile device 98, and indicate on the webpage 96 that the telematics unit 14 and the mobile device 98 are linked or associated with each other. The fact that the mobile device 98 is linked to or associated with the telematics unit 14 may then be stored in a user profile in one of the databases 72 at the call center 24.

Registering may otherwise be accomplished by placing a call (using, e.g., the telematics unit 14, the mobile device 98, or other communications device) to the call center 24, and submitting a request to a call center advisor 62, 62' to associate the telematics unit 14 with the mobile device 98, and visa versa. More specifically, the call is received at the switch 68, which directs the call to an appropriate advisor 62, 62' (or to an appropriate call center if the call is received at a data center). Upon authorizing the caller (e.g., who accurately responds to a number of challenge questions), the caller may submit the identification information of the mobile device 98 to the advisor 62, 62', who/which may use the information to associate, and thus register the mobile device 98 with the telematics unit 14. This information is stored in the user profile in the database 72. In an example, the advisor 62, 62' may access the webpage 96 and associate the two devices 14, 98 together (e.g., as if the user had accessed the webpage 96 himself/herself).

It is also possible to register the device 98 using a user interface inside the vehicle 12, such as a touch screen (e.g., a NAV screen or the like) that is operatively associated with telematics unit 14. In an example, the touch screen may be the same as the display 80 depicted in FIG. 1. This method enables the user to register the mobile device 98 substantially the same way as he/she would register the device 98 by accessing the webpage 96. It is to be understood that, in this method, preferences (which are described in detail below) are automatically stored in the user profile stored in the memory 38 of the telematics unit 14 as soon as the preferences are set by the user.

It is to be understood that the user (or caller) may want to associate or link a number of mobile devices 98 with a single telematics unit 14. For instance, the telematics unit 14 may be located in a vehicle 12 that is shared by two or more people (such as a family vehicle, where the father, mother, and children are each able to operate the vehicle 12), and each person owns or has in his/her possession an individual mobile communications device 98. Accordingly, each of the mobile devices 98 may be associated with the same telematics unit 14 using any of the examples of the registration process described herein. Similarly, it is to be understood that the user (or caller) may want to associate or link one mobile device 98 with multiple telematics units 14. For instance, a family may own multiple vehicles 12, each of which has its own telematics unit 14, and wish to associate one family member's mobile device 98 with each of the telematics units 14. Accordingly, the single mobile device 98 may be associated with each telematics unit 14 using any of the example methods disclosed herein.

In an example, during the registering of the mobile device 98 (via the webpage 96, via the touch screen, or during the phone call with the call center 24), the user may select preferences which are stored in a user profile in the database 72 at the call center 24. The user profile may, for example, be set up at the time the user creates his/her account with the call center 24 (such as when the user subscribes to telematics services offered by the telematics service provider), and may include personal information of the user, such as the user's name, garage address, billing address, account settings, etc. The user-selected preferences that are stored in the user profile may include, for instance, an identification of the mobile device(s) to be restricted (via, e.g., the MDN of the device(s) or short range wireless security codes/names (also referred to as BLUETOOTH® names)) and how the restriction should be applied. As used herein, a "restricted" device is one that is subject to the application of the example methods disclosed herein. In one example, the user may select how the functionality of the audio component 60 is to be adjusted when the telematics unit 14 detects that the mobile device 98 is not located in the predefined location (e.g., holder 100, port 100', etc.). For instance, the user may select to mute, fade, and/or scramble any output being played from the audio component 60 at the time of the detecting. The user may also or otherwise select to have an alert tone played through the audio component 60 when the audio component is adjusted in response to the detecting. This alert tone may be played in instances where no output is being played by the audio component 60 at the time of the detecting, or may be played over any output that is being played by the audio component 60 at the time of the detecting. In the latter instance, the volume of the output may be automatically lowered upon playing the alert tone.

In an example, the user may also select to have an audible warning message played over the audio component 60 and/or a text-based warning message displayed on the display unit 80. This warning message may be used to apprise the user that the mobile device 98 is not located in/at the predefined location (e.g., holder 100, port 100'), and may state something similar to "The device is not in the holder!", or the like. The warning message may also be formulated to include instructions for the user, such as to command the user to place the device 98 back into the predefined location (e.g., holder 100, port 100'). This message may be something similar to "Please put the device back in the holder!", or the like.

The warning message may be formulated by the user, e.g., by typing the message (such as in a text box provided on the webpage 96) or reciting the message (such as to the advisor 62, 62' during a phone call with the call center 24, who/which in turn types the message into the webpage 96 for the user). The user may otherwise select the warning message from a list of options, e.g., presented in a drop-down menu on the webpage 96 or from an option menu presented to the user during the phone call. The warning message may also be formulated using the touch screen operatively disposed in the vehicle 12.

In instances where the user creates or selects the warning message using the webpage 96, the message is stored in the user profile in the form of a text-based message. Utilizing a text-to-speech conversion program that is executable by the processor 36 associated with the telematics unit 14, the message is converted into speech so that it can be played by the audio component 60.

It is further contemplated that the user may record a voice message upon setting up his/her preferences during the registering of the device(s) 98. This may be accomplished, e.g., by reciting the message into the microphone 28 during the phone call with the call center 24, such as during registration of the device 98. The recorded voice message may be stored in the user profile, and may be played by the audio component 60 at the time of the detecting.

In another example, the user may select to have the warning message presented as a text-based message on the display unit 80. In instances where the warning message is stored in the user profile as a text-based message, via the telematics unit 14, this message may be retrieved directly from the user profile and displayed on the display 80. However, in instances where the warning message is stored in the user profile as a voice message (such as one created during the phone call to the call center 24, as described above), the voice message may be converted to text using a speech-to-text conversion program executable by the processor 36 of the telematics unit 14.

In still another example, the user may select (e.g., during the registering of the mobile device 98) to have a warning light 114 (shown in FIGS. 2-5) activated as yet another way of apprising the user that the mobile device 98 is not located in/at the predefined location (e.g., holder 100, port 100'). This warning light 114 may be placed anywhere inside the cabin area 102 of the vehicle 12 that is visibly noticeable by (i.e., within the field of view of) the vehicle user (e.g., the driver). In one example, the warning light 114 is operatively disposed on the dashboard 116 inside the cabin area 102, and is positioned within the line of sight of the vehicle driver (as shown in FIGS. 2-5). The warning light 114 may otherwise be placed on the steering wheel, the center console 104 (e.g., next to the display 80), on the rear view mirror, on the windshield in a position that would not obstruct the driver's view, or the like. In some cases, it may be desirable to include two or more warning lights 114, where each is disposed in a different position inside the cabin area 102 of the vehicle 12.

The warning light 114 may be configured to be non-lit when inactivated (as shown in FIGS. 2 and 4-6), and configured to light up when activated (as shown in FIG. 3 by the lines drawn around the light 114 signifying that the light is illuminated, shining, or the like). In one example, the warning light 114 may blink, for instance, at a constant blink rate (e.g., one blink every half a second), or blink according to a predefined sequence (e.g., one blink and then three fast blinks). The warning light 114 may otherwise be configured to continuously shine (e.g., with no blinks) when activated. The warning light 114 may be activated upon muting the audio component 60, fading the output being played by the audio component 60, scrambling the output being played by the audio component 60, and/or while an alert tone is being played over the audio component 60.

Upon registering the device 98, the user may also be able to select preferences for how the adjusting of the functionality of the audio component 60 is to be executed. For instance, the user may select to have the functionality of the audio component 60 adjusted immediately upon detecting that the device 98 is not located in/at the predefined location (e.g., holder 100, port 100'), or may select a grace period measured from the time of the detecting. This grace period may, e.g., be a predefined amount of time (e.g., 5 seconds) which enables the vehicle user to place the device 98 back to the predefined location (e.g., holder 100, port 100') before the audio component 60 is adjusted.

It is to be understood that, in instances where a family of devices 98 is registered with a single telematics unit 14, one, more, or all of the devices 98 may be identified as being subject to restriction via the examples of the method disclosed herein. For example, the user may select to not have the method activated for Mom's device, and may also select to have the method activated for the child's device. These selections may be changed, by an authorized user, via accessing the webpage 96, calling the call center 24, or via the touch screen inside the vehicle 12.

Further, in instances where the user registers more than one device 98, the user-selected preferences identified above may be the same for each of the registered devices 98, or may be different for each respective device 98. In the latter case, the user may select to not have the method activated in instances where Mom or Dad's mobile device 98 is identified, and to have the method activated in instances where the child's mobile device 98 is identified. Further details of identifying the mobile device 98 will be described below.

It is to be understood that the preferences are set until the authorized user accesses the webpage 96 or the like, and removes or otherwise changes the preferences associated with one or more the mobile devices 98. The removed/changed preferences will take effect as soon as they are stored in the user profile, and remain as active preferences until the user's subscription with the call center 24 expires or is canceled, or for the duration predefined by the user. It is further to be understood that authorized persons alone are allowed to remove/change the preferences stored in the user profile (e.g., Mom and Dad may be authorized to remove/change the preferences for all of the mobile devices 98 registered with the vehicle 12, whereas their children may not be authorized). Those that are authorized to remove/change the preferences are pre-established by the user who originally set up the subscription account, or by others who the user has indicated as being authorized to change the preferences. Those that are authorized to remove/change the preferences may be identified, by the user, when the preferences are originally set up and/or may be added or removed at any subsequent time.

Once the preferences are set (or each time the preferences are changed) upon registering the device 98, the preferences are directly downloaded to and stored in the memory 38 of the telematics unit 14 (e.g., as part of a user profile) from the webpage 96 or the call center 24. The preferences are utilized by the telematics unit 14 to determine if the method disclosed herein should be activated for an identified or recognized mobile device 98 (e.g., which may be accomplished upon connecting the registered device 98 with the telematics unit 14, which will be described further below). The telematics unit 14 also utilizes the preferences to determine how the identified device 98 should be restricted, as previously described.

The telematics unit 14 utilizes the preferences stored in the memory 38 to identify an operator of the mobile vehicle 12. In one example, via the user-selected preferences, the telematics unit 14 is aware of the mobile device(s) 98 that is/are associated therewith, and continuously monitors (via, e.g., the antenna 51) for the presence of the mobile device(s) 98 inside the vehicle 12. Upon detecting the presence of one of the mobile devices 98 (which, for example, may occur when the mobile device 98 is carried into the vehicle 12 with the person in possession of the device 98, and both the mobile device 98 and the telematics unit 14 are in an ON state), the telematics unit 14 connects with the mobile device 98 via the short range wireless network 48 (such as, e.g., a BLUETOOTH® connection).

The examples of the registration process described above may otherwise be used to set up the user preferences alone, and not to associate or otherwise pair the mobile device 98 with the telematics unit 14. In this case, the telematics unit 14 is unaware of the mobile device 98 until the device 98 is paired with the telematics unit 14 upon setting the mobile device 98 (and/or the telematics unit 14) to a short range wireless connection mode, which enables the mobile device 98 to pair with the telematics unit 14 (and/or the mobile device 98) and establish a short range wireless connection for the first time. In this example, the telematics unit 14 is not actively searching for the mobile device 98 until after the mobile device 98 has become a recognized device. It is to be understood that the device 98 is considered to be a recognized device as soon as it is paired with the telematics unit 14 for the first time. The telematics unit 14 adds the newly paired device 98 to a list of recognized devices (i.e., those devices that have previously been paired with the telematics unit 14) upon pairing for the first time, and is therefore aware that the device 98 exists. Likewise, the device 98 adds the newly paired telematics unit 14 to a list of recognized devices, and is therefore aware that the telematics unit 14 exists. Afterwards, the telematics unit 14 (and/or the mobile device 98) automatically looks for the other device whenever the telematics unit 14 (or the mobile device 98) is powered on. Thus, whenever the device 98 is inside the vehicle 12 (or within proximity of the short range wireless connection system 48), the telematics unit 14 detects the presence of the device 98 (or the device 98 detects the presence of the telematics unit 14) and automatically connects with the device 98 (or the telematics unit 14) upon making the detection.

Once a short range wireless connection between the telematics unit 14 and the mobile device 98 has been established, the telematics unit 14 scans the preferences stored in the memory 38 to determine whether or not the connected mobile device 98 has any restrictions associated therewith. If, for example, the telematics unit 14 connects with Mom's mobile device, upon scanning the preferences, the telematics unit 14 may recognize that Mom's device is not subject to any restrictions. In this example, the telematics unit 14 remains connected so that the user can use the mobile device 98 through the hands free telematics unit 14. However, for example, if the telematics unit 14 connects with the child's device 98, upon scanning the preferences, the telematics unit 14 may recognize that there is a restriction associated with the device 98. Upon recognizing that a restriction is associated with the child's device 98, the telematics unit 14 will activate the method according to the user-selected preferences.

Upon recognizing that the connected mobile device 98 has a restriction associated therewith, the telematics unit 14 monitors for a signal that indicates that the device 98 is not located in/at the predefined location (e.g., holder 100, port 100') inside the cabin area 102 of the vehicle 12. It is to be understood that the telematics unit 14 continues to monitor for the signal so long as the device 98 is connected with the telematics unit 14. In other words, the monitoring ceases when the telematics unit 14 recognizes that the vehicle 12 ignition is turned to an OFF state, the device 98 is turned to an OFF state or has been moved outside of the short wireless range necessary for connecting with the telematics unit 14, or the like.

It is to be understood that in some instance, the monitoring of the signal by the telematics unit 14 does not begin until after the vehicle 12 has been set into motion. As used herein, the vehicle 12 may be set into motion when the ignition state of the vehicle 12 is on, a transmission system of the vehicle 12 is set into a mode that enables the vehicle 12 to move (e.g., the drive mode or the reverse mode), and the vehicle 12 is physically moving. It is further to be understood that the monitoring for a signal stops once the vehicle 12 is stopped, is parked, or is otherwise not in motion.

Once the vehicle 12 is in motion, the telematics unit 14 recognizes that the device 98 is not located in/at the predefined location (e.g., holder 100, port 100') upon receiving a signal indicating the same from a detector 106 (or 106' or 106"). Referring to FIG. 2, for example, the user may place the device 98 in the holder 100 upon entering the vehicle 12 and before the vehicle 12 is in motion. It is to be understood that the device 98 is fully operable upon being placed in/at the predefined location (in this example, the holder 100), and thus the user can still receive and send voice calls, text messages, etc. So long as the device 98 is inside the holder 100, no signals are sent to the telematics unit 14 from the detector 106 operatively associated with the holder 100. On the other hand, if the user removes the device 98 from the holder 100, as shown in FIG. 3 for example, the detector 106 automatically detects that the device 98 has been removed from the holder 100, and sends a signal (via the bus 34) to the telematics unit 14 indicating that the removal has occurred. The examples of the detector 106, 106', 106" disclosed herein are capable of communicating with the telematics unit 14 via the bus 34.

In another example, as shown in FIG. 4, the user may connect the device 98 to a dongle 112, and then plug the dongle 112 into a port 100', such as a charging port. It is to be understood that the port 100' is a vehicle-dedicated port (such as, e.g., a USB port, a plug, a cigarette lighter, a power port, etc.) that is in operative communication with the telematics unit 14 via the bus 34. In this example, the dongle 112 includes a cord having a length that is short enough to prevent the user (e.g., the vehicle driver) from being able to place the mobile device 98 adjacent to his/her ear while driving the vehicle 12 without disconnecting the dongle 112 from the port 100'. As long as the dongle 112 is connected to the port 100', the device 98 is considered to be positioned in the predefined location and thus no signal will be sent to the telematics unit 14. When the user disconnects the dongle 112 from the port 100', the detector 106' associated with the port 100' automatically sends a signal (via the bus 34) to the telematics unit 14 indicating that the disconnection has occurred.

In yet another example, shown in FIG. 5, the mobile device 98 may contain the radio frequency identification (RFID) tag 117, and the predefined location (which, in this example, may be the holder 100) may contain the detector 106" in the form of the RFID reader having a range limited to the geometry of the holder 100. When the device 98 is placed in the holder 100, a radio frequency (RF) connection is established and remains established until the device 98 is removed from the holder 100. When this occurs, the RF connection is severed, and the RFID reader/detector 106" automatically sends a signal to the telematics unit 14 indicating that the connection has been severed.

In still another example, the mobile device 98 may contain an accelerometer/gyroscope that transmits energy from the device 98. The transmitted energy represents an acceleration of the device 98. An application (separate from the application 103) resident on the mobile device 98 may be used to determine if the energy transmitted by the accelerometer/gyroscope exceeds a predetermined threshold value. For instance, an increase of about 3 m/s$^2$ to about 5 m/s$^2$ in the acceleration occurring over a predefined period of time (e.g., ranging from 30 seconds to 1 minute) may indicate that the device 98 may be in use, and thus is not stowed in/at the predefined location (e.g., 100 or 100') inside the vehicle 12. The application may, for example, be downloaded onto the mobile device 98 from a server 70 of the call center 24 (e.g., via a webpage 96 of the telematics service provider) or via an application store associated with the mobile device 98. If the application determines that the energy exceeds the predetermined threshold value, the application may send (via the BLUETOOTH® connection) a message to the telematics unit 14 indicating that the device 98 is not located in the predefined location.

In some cases, the mobile device 98 itself may have a locking function; e.g., a function that, when executed (via, e.g., a button press on the device 98, touch screen, a verbal command, or the like), locks the device 98 so that the device 98 cannot be used at least to initiate voice calls and/or text messages, to access the Internet, to check e-mails, and/or to activate one or more applications resident on the mobile device 98. Likewise, the device 98 may also include an unlocking function to unlock the device 98 that was previously set into the locked state. In another example of the method disclosed herein, upon establishing a connection with the telematics unit 14 (via, e.g., the BLUETOOTH® connection), the mobile device 98 sends a message to the telematics unit 14 indicating that the device 98 is in a locked state. As soon as the device 98 is unlocked, the device 98 automatically sends a message to the telematics unit 14 (via the BLUETOOTH®connection) indicating that the device 98 has been unlocked. Upon receiving the message from the device 98, the telematics unit 14 concludes that the device 98 has been removed from, or is not located in the predetermined location.

In an example, upon receiving the signal from the detector 106, 106', 106" or the message sent from the mobile device 98 (e.g., in the locked/unlocked example), the telematics unit 14 automatically generates and sends another signal to the in-vehicle audio component 60. As previously mentioned, this signal includes a command to adjust a functionality of the audio component 60, as well as instructions for how the functionality is to be adjusted. The instructions are formulated, e.g., upon reviewing the user preferences stored in the memory 38 associated with the telematics unit 14. In an example, the functionality of the audio component 60 is automatically adjusted in response to the command.

In one example, the functionality of the audio component 60 may be adjusted to mute, fade, or scramble an output then-currently being played by the audio component 60. In instances where the audio component 60 is muted or faded, all of the output is muted or faded except for incoming voice calls from the telematics service center (e.g., the call center 24), public safety organizations (e.g., the police), and/or emergency calls. Further, the method may include playing the warning message over the audio component 60 as previously described. For example, while driving the vehicle 12, the user may pick up his/her mobile device 98 from inside the holder 100 to answer an incoming call, read an incoming text message, or the like. Upon picking up the device 98 (and thus removing the device 98 from the holder 100), the detector 106, 106', 106" detects that the device 98 is no longer in the holder 100 or 100', and sends a signal (via the bus 34) to the telematics unit 14 indicating the same. Upon receiving this signal, the telematics unit 14 scans the user profile for any user-selected preferences associated with the device 98, and sends a signal to the audio component 60 (via the bus 34) that includes instructions pertaining to the user-selected preferences. In an example, the instructions (based on the user-selected preferences) may include a command to mute the audio component 60 and, once muted, to have an audible warning message played by the component 60. In another example, the instructions (based on the user-selected preferences) may include a command to mute the audio component 60 and, once muted, to have a text-based warning message shown on the display 80. In this example, another signal may be sent from the audio component 60 to the display 80 with instructions to display the text-based message. In some cases, the telematics unit 14 may generate a second signal, which is sent directly to the display 80 with instructions to display the text-based message. In these cases, the audio component 60 would not have to send a signal to the display 80 with instructions to do the same.

It is to be understood that when a text-based message is displayed on the display 80, any content previously being displayed on the display 80 may be completely faded out so that the warning message can be displayed on the blank screen. In another example, the font size of any text being displayed at the time of receiving the command may be decreased, and the warning message may be displayed over the decreased font. This may enable the warning message to stand out over the other content shown on the display 80 screen. It is also possible to adjust the contrast ratio between the warning message and the background palette of the display 80 (e.g., the background palette may be faded slightly so that the text of the warning message stands out).

In another example, the instructions sent by the telematics unit 14 may include a command to scramble the audio output. In this example, a text-based message may also be displayed on the display 80 when the user-selected preferences indicate that such a message should be displayed. It is also contemplated that a warning message may also or otherwise be played over the scrambled output. In this case, the volume of the scrambled output may, in some instances, be lowered so that the warning message can be heard.

In still another example, upon muting, fading, or scrambling the output being played on the audio component 60, the instructions may further include a command to activate the warning light 114. It is to be understood that the warning light 114 may be activated alone or in combination with a warning message displayed on the display 80 and/or played by the audio component 60. Furthermore, other vehicle systems may be activated according to the instructions included in the command signal sent from the telematics unit 14 to the audio component 60. For instance, upon adjusting the functionality of the audio component 60, a signal may be sent to activate the vehicle horn, to activate interior cabin lights, to activate the audio component 60 to play a chime or alert tone (as previously described), and/or the like.

It is to be understood that any other combination of commands may be applied, by the audio component 60, the display 80, and/or the warning light 114, in response to the instructions sent by the telematics unit 14 according to the user-selected preferences.

In some cases, the device 98 may be connected (via, e.g., the BLUETOOTH® connection) with the telematics unit 14, and the vehicle 12 may be set into motion before the user has a chance to physically stow the device 98 in/at the predefined location (e.g., holder 100, port 100'). In these cases, the telematics unit 14 may receive a signal from the detector 106, 106", associated with the holder 100 that indicates that the device 98 is not inside the holder 100, or from the detector 106' associated with the port 100' that indicates the device 98 is not plugged into the port 100' (via the dongle 112). In response to the signal, the telematics unit 14 may automatically send a signal to the display 80 or to the audio component 60 to present a reminder message to the user. The reminder message may state something similar to "Please put the device in the holder!", and the reminder message may be displayed or presented to the user until he/she places the device 98 in or at the predefined location (holder 100, port 100').

In an example, the adjustment made to the functionality of the audio component 60 (as well as the playing of the audible warning message through the audio component 60, the displaying of the text-based warning message on the display 80, and/or the activating of the warning light 114) continues until the mobile device 98 is, for example, placed back into/at the predefined location (e.g., is placed back in the holder 100, as shown in FIG. 2). In the example depicted in FIG. 2, the detector 106 determines that the device 98 is placed back into the holder 100 when it detects that the presence of the device 98 has completed the circuit defined, in part, by the mechanical switch (i.e., the circuit is closed). When this occurs, the detector 106 sends another signal to the telematics unit 14 indicating that the circuit is closed, and the telematics unit 14 in turn sends another signal to the audio component 60, for example, to restore the functionality of the audio component 60. The telematics unit 14 may also send another signal to the display 80 to restore the functionality of the display 80 (e.g., to remove the warning message, if one is displayed, and to re-display the content on the display 80 that was being displayed at the time the warning message was displayed) and/or to the warning light 114. This other signal may otherwise be sent directly from the audio component 60 to the display 80 and/or to the warning light 114. Once the audio component 60 (and possibly the display 80 and/or the warning light 114) has been restored, the telematics unit 14 goes back to monitoring for another signal from the detector 106 indicating that the device 98 has been removed from the predefined location (e.g., holder 100).

In another example, the functionality of the audio component 60 (and the display 80 and/or the warning light 114) is restored upon detecting, via the telematics unit 14, that the device 98 has been moved to a location outside a short range wireless distance from the telematics unit 14. When this occurs, the short range wireless (i.e., BLUETOOTH®) connection previously established between the device 98 and the telematics unit 14 ends, and the devices 14, 98 are no longer connected. This may also occur when the device 98 is powered off (via, e.g., physically selecting an OFF state using a function key associated with the device 98, when the battery-life of the device 98 has ended, etc.). Upon recognizing that it is no longer connected with the mobile device 98, the telematics unit 14 automatically sends a signal to the audio component 60 to restore its functionality as previously described.

The functionality of the audio component 60 (and the display 80 and/or warning light 114) may also be restored upon unpairing the mobile device 98 from the telematics unit 14. This may be accomplished, e.g., by selecting a command on the device 98 to unpair the device 98 from the telematics unit 14. When an unpairing command is selected, the device 98 no longer recognizes the telematics unit 14 and the short range wireless connection established between the devices 14, 98 is automatically terminated. The device 98 may otherwise be unpaired from the telematics unit 14 by calling the call center 24, and requesting to unassociate the device 98 with the telematics unit 14, or by selecting to unassociated the devices 14, 98 using the touch screen disposed inside the vehicle 12. It is to be understood that the unassociating of the devices 14, 98 may be accomplished by an authorized person.

As previously stated, the examples of the method described hereinabove are accomplished while the vehicle 12 is in motion. Thus, in yet another example, the functionality of the audio component 60 may be restored upon detecting that the vehicle 12 is no longer in motion. This may be accomplished, for instance, via the telematics unit 14, by detecting (in response to a signal received from the vehicle transmission system) that the transmission system has been placed into a park mode and/or the vehicle ignition has been turned to an OFF state. The fact that the vehicle 12 is no longer in motion may also be detected by detecting that the vehicle speed is zero and the transmission system has been placed into the park mode, thereby indicating that the vehicle 12 is stopped or parked.

Another example for controlling mobile communications will now be described in conjunction with FIGS. 1 and 6 through 8. Referring now to FIG. 7, the example method involves establishing an RFID connection between the RFID reader 119 attached to the mobile device 98 and the RFID tag 117 attached to the vehicle interior 102 at or near the predefined location 100, as shown by reference numeral 700. The RFID connection may be established, for instance, by placing the mobile device 98 (which has the RFID reader 119 operatively attached thereto, as shown in FIG. 6) within the RFID connection range/interrogation zone of the RFID tag 117 that has been previously disposed at or near the predefined location 100 inside the vehicle interior 102. It is to be understood that the mobile device 98 may be placed anywhere inside the vehicle interior 102 so long as the RFID tag 117 (which is attached to the vehicle interior 102 or to an object representing the predefined location 100 that is physically attached to the vehicle interior 102, such as the mobile device holder) falls within the RFID connection range of the RFID reader 119 attached to the device 98. In other words, the mobile device 98 may be placed at the predefined location 100, or in any position inside the vehicle 12 that is near the predefined location 100 and within the RFID connection range. As mentioned above, the distance identifying the RFID connection range may be determined based, at least in part, on the amount of RFID energy utilized by the reader 119 to establish an RFID connection with the tag 117. As an illustrative example, if the tag 117 is placed on the center console 104 of the vehicle interior 102, and the RFID connection range is preset to be about 25 cm, then the mobile device 98 will have to be placed near the center console 104 such that the distance between the mobile device 98 and the tag 117 does not exceed 25 cm. It is to be understood that the RFID connection range may be adjusted (e.g., by the manufacturer, dealership, etc.) based on the positioning of the tag 117 inside the vehicle 12. For instance, if the tag 117 is placed on the glove compartment at the passenger side of the vehicle interior 102, then the RFID connection range may be increased so that the mobile device 98 may suitably be placed, e.g., in a mobile device holder in the center console 114 so that an RFID connection between the reader 119 and the tag 117 can still be established.

Further, the RFID connection remains established until i) the connection is broken, e.g., by moving the mobile device 98 to a position outside of the interrogation zone, or ii) upon placing the transmission system of the vehicle 12 into a park mode and/or switching the vehicle ignition system into an OFF state. In the latter instance, there would be no need to control mobile communications of the device 98 (at least in part because the vehicle 12 is not moving), and thus method ends. However, in the prior instance (i.e., upon breaking the RFID connection), the method proceeds to one of several aspects for controlling mobile communications, and these aspects of the method will be described individually in some detail hereinbelow.

To reiterate from above, the RFID tag 117 contains information identifying the vehicle 12 within which the tag 117 is placed. This information is automatically transmitted, via the antenna associated with the tag 117, to the RFID reader 119 upon establishing the RFID connection. In turn, the reader 119 forwards this information to the processor 101 associated with the mobile device 98. The information may be forwarded to the processor 101 as a signal traveling wirelessly or via a wire if the reader 119 is separate from the mobile device 98, or may travel via an information bus inside the mobile device 98 if the reader 119 is part of the device 98.

When the processor 101 receives the signal from the RFID reader 119 that an RFID connection has been established, the processor 101 initiates the application 103 resident on the device 98 that is responsible for controlling mobile communications of the device 98 throughout the life of the presently-established RFID connection. This step is shown at 702 in FIG. 7. The application 103 includes computer readable code for performing a number of functions associated with controlling the mobile communications of the device 98. Although the application 103 has been initiated upon establishing the RFID connection, in one example, the actual controlling of mobile communications of the device 98 via the application 103 may occur in response to a trigger. The trigger may include detecting that the vehicle 12 is physically in motion, or that the vehicle 12 has reached a predefined vehicle speed. In an example, the processor 101 utilizes the signal indicating that an RFID connection has been established (which was received from the reader 119, as mentioned above) as a trigger to automatically establish a short range wireless connection with the telematics unit 14 of the vehicle 12, as shown at 704 in FIG. 7. This may be accomplished, for instance, by setting the mobile device 98 to a short range wireless connection mode, where the device 98 automatically looks for the telematics unit 14 (which was previously paired with the device 98). When the device 98 is within short range wireless connection range with the telematics unit 14 (which may occur immediately upon setting the device 98 into the short range wireless connection mode since the device 98 is located inside the vehicle interior 102 and thus within short range wireless connection range of the telematics unit 14), the telematics unit 14 detects the presence of the mobile device 98 (or the device 98 detects the presence of the telematics unit 14) and automatically connects with the device 98 (or the telematics unit 14) upon making the detection. Further details of how the short range wireless connection may be established are set forth above in conjunction with the example method described in conjunction with FIGS. 1-5.

Via the short range wireless connection, the mobile device 98 sends a command to the telematics unit 14 to initiate monitoring of the vehicle speed, as shown at 706 in FIG. 7. In turn, the telematics unit 14 sends a request to the processor associated with the vehicle speed sensor for information pertaining to the then-current speed of the vehicle 12. In response to the request, the processor associated with the speed sensor obtains speed signals directly from the speed sensor, and transmits those signals to the processor 36 of the telematics unit 14 via the bus 34. The processor 36 then utilizes the speed signals to determine the instantaneous speed of the vehicle 12. If the processor 36 determines that the instantaneous speed of the vehicle 12 is not greater than zero or has not reached the predefined vehicle speed, then the processor 36 sends another request to the processor associated with the speed sensor for updated vehicle speed data. This process may continue until the processor 36 has detected that the vehicle speed is greater than zero, or has reached the predefined vehicle speed. When this occurs, the telematics unit 14 sends a data message back to the mobile device 98 via the short range wireless connection, which includes a command to activate the portion of the application 103 responsible for controlling mobile communications, as shown at step 708 in FIG. 7.

Referring back to step 704, in another example, the portion of the application 103 responsible for controlling mobile communications may be activated upon detecting, via the telematics unit 14, that the ignition system of the vehicle 12 is in an ON state, and the transmission system of the vehicle 12 has been placed into any mode other than the park mode (e.g., a drive mode, a reverse mode, etc.). In this instance, the ignition system ON state and the transmission mode are the triggers for controlling mobile communications. Upon detecting that the ignition system is in an ON state and the transmission mode has been moved out of park mode at step 704, the telematics unit 14 sends a data message back to the mobile device 98 via the short range wireless connection to activate the portion of the application 103 responsible for controlling mobile communications at step 708.

In yet another example, the portion of the application 103 responsible for controlling mobile communications is activated as soon as the application 103 is initiated at step 702. Thus, in this example, mobile communications may be controlled without having to rely on a trigger from one or more vehicle systems. In other words, mobile communications may be controlled without having to use the telematics unit 14.

At step 710, mobile communications of the mobile device 98 may be controlled via the application 103 resident on the mobile device 98.

Referring now to FIG. 8, the mobile communications of the mobile device 98 are controlled, via the application 103 resident on the device 98, based on the user-selected preferences set forth in the user profile. This is shown at step 800 in FIG. 8. Upon activating the portion of the application 103 responsible for controlling mobile communications, the processor 101 refers to the user profile previously stored in a memory 105 associated with the device 98. However, in instances where a user profile has not been previously stored, the user profile may be obtained by the device 98 from another source, such as from the telematics unit 14, the call center 24, the remotely accessible page 96, and/or some other facility including the user profile stored in a database at that facility. In some cases, the mobile device 98 may retrieve the user profile as soon as the processor 101 receives the signal from the RFID reader 119 indicating that the RFID connection has been established with the RFID tag 117. In other cases, the mobile device 98 may retrieve the user profile as soon as the portion of the application 103 responsible for controlling mobile communications has been activated.

In an example, via the short range wireless connection established between the mobile device 98 and the telematics unit 14, the mobile device 98 (via the application 103 resident thereon) may request a copy of the user profile associated with the owner of the vehicle 12 from the telematics unit 14. In this example, the request may contain the vehicle identification information read from the RFID tag 117, and the processor 36 of the telematics unit 14 may utilize the information to identify the owner of the vehicle 12 and the user profile stored in the memory 38 of the telematics unit 14. Then, the telematics unit 14 will send either a copy of the entire user profile or a copy of the relevant portion(s) of the user profile back to the mobile device 98 using the short range wireless connection. The mobile device 98 may then utilize the user-selected preferences or services contained in the received user profile to control mobile communications, as previously mentioned.

In instances where the telematics unit 14 does not have a copy of the user profile stored in the memory 38 thereof, the telematics unit 14 may automatically establish a data connection (e.g., a packet data session) with the call center 24 upon receiving the request from the mobile device 98. This data connection may include packet data including a request for a copy of the user profile from the call center 24. The request may be received by the data aggregator 75, which may retrieve a copy of the user profile from the appropriate database 72 and transmit it (in the form, e.g., of packet data) back to the telematics unit 14. The telematics unit 14 may forward the received copy of the user profile to the mobile device 98, or store a copy of the user profile in the memory 38 before sending another copy of the user profile to the mobile device 98.

In another aspect of this example method, the mobile device 98 may automatically establish an Internet connection so that the device 98 can retrieve and download a copy of the user profile directly from the user's personal webpage 97. It is to be understood that the mobile device 98 may be authorized to retrieve such information from the webpage 97, e.g., upon the webpage 97 recognizing the device's 98 Internet protocol (IP) address. Once the device 98 has downloaded a copy of the user profile from the webpage 97, the user profile may be stored in the memory 105 associated with the device 98. It is to be understood that the mobile device 98 may also be able to obtain a copy of the user profile from the webpage 97 indirectly, such as through the telematics unit 14. In this case, the mobile device 98 may establish a short range wireless connection with the telematics unit 14, and the telematics unit 14 may then establish an Internet connection so that the telematics unit 14 can retrieve and download a copy of the user profile from the webpage 97. The telematics unit 14 may then forward a copy of the user profile retrieved from the webpage 97 to the mobile device 98 during the short range wireless connection.

As previously mentioned, the mobile device 98 may, in some instances, already have a copy of the user profile stored in a memory 105 associated therewith (which, e.g., may have been previously retrieved by the device 98, downloaded to the device 98 from the telematics call center 24 upon setting up the user's account or subscription, etc.). In these instances, the device 98 does not have to establish a short range wireless connection with the telematics unit 14 upon receiving the signal from the RFID reader 119 for the purposes of obtaining the user profile. However, the device 98 may be configured to establish the short range wireless connection with the telematics unit 14 upon receiving the signal in order to request updates for the user profile that was previously stored in the device 98. In other cases, an updated copy of the user profile may be automatically downloaded to the mobile device 98 periodically (e.g., every week, every month, etc.), each time the user profile is updated, or the like, rather than on request by the device 98 as soon as an RFID connection has been established.

As soon as the mobile device 98 receives a copy of the user profile (unless the device 98 already has a copy of the user profile when the RFID connection has been established), the processor 101 of the mobile device 98 automatically refers to the user profile to obtain information pertaining to user-selected preferences and/or user-selected services for controlling mobile communications of the device 98. In one aspect of the instant example of the method, the information from the user profile may be used, by the processor 101 while executing the application 103 resident thereon, to determine i) which functionality of the device 98 should be adjusted and ii) how the functionality is to be adjusted. As used herein, a "functionality" of the mobile device 98 that may be adjusted refers to an element or attribute of the mobile device 98 that is configured to perform a particular function. Examples of functionalities that are adjustable include text messaging capabilities, voice calling capabilities, game playing capabilities, electronic mailing (or e-mail) capabilities, and/or the like. In some cases, one or more of these functionalities may include sub-functionalities. For example, the text messaging capabilities may include a notification function of an incoming text message, a text message receiving function, a text message creation function, and/or the like. One or more of the functionalities/sub-functionalities may be disabled (and then re-enabled) by the application 103 internal to (stored on) the mobile device 98 upon detecting, via the mobile device 98, that the device 98 is no longer located in the predefined location 100.

Further, the application 103, when executed by the processor 101 of the device 98, includes machine readable instruction (e.g., software routines/program code embodied on non-transitory media) that apply the adjusting/re-adjusting of the functionality/sub-functionality of the mobile device 98. In an example, upon receiving the information read from the RFID tag 117, the processor 101 activates the application 103 resident on the device 98, which initiates a program code associated with the application 103 that is responsible for adjusting the user-selected functionality of the device 98. Once initiated, the processor 101 (via the application 103) actually adjusts the functionality of the device 98 using other suitable software programs and/or routines. This step is shown at 802 in FIG. 8. If, for example, the functionality is a message notification function of the user's mobile device 98, the processor 101 may restrict the message notification function so that the user will not be notified (via, e.g., a ring tone or a vibration of the device 98) of an incoming text message. Thus, the disabling of the message notification function includes the disabling of a ring mode or vibration mode of the user's device 98 whenever a new text message is received. In this example, the message notification function is restricted so long as the device 98 is in an adjusted functionality (in this case, disabled) operational mode. As such, incoming messages will be received by the mobile device 98, however the user will not know that the messages have been received until the user checks the device 98 for new messages.

In another example, the adjusting of the functionality of the mobile device 98 may include incorporating additional functions/features to the operational mode of the device 98. This may be accomplished in addition to, or instead of restricting a pre-existing function/feature. For instance, the user profile may require an audible notification of any incoming text messages. This may be accomplished, e.g., by automatically establishing a short range wireless connection with the telematics unit 14 (if one has not yet been established already). This connection enables the mobile device 98 to link to various in-vehicle components that are in communication with the telematics unit 14 via the bus 34. Thus, upon receiving a text message, the user may be notified of the same, for instance, through the in-vehicle audio component 60. More specifically, when an incoming text message is received by the mobile device 98, the message (in its text form) may be transmitted from the device 98 to the telematics unit 14 and may ultimately be recited to the user in a hand-free mode. Utilizing a text-to-speech program that is executable by the processor 36 of the telematics unit 14, the text content of the message is converted into an audible format. In response to a prompt, the user may elect to listen to the audible form of the message, which is recited to the user through the speaker(s) 30, 30'. In response to another prompt, the user may elect to respond to the message. If the user elects to respond, the user may recite an audible reply into the microphone 28, which is converted into text via a speech-to-text program also executable by the processor 36. The text form of the reply is then transmitted from the telematics unit 14 to the mobile device 98, which is forwarded from the device 98 to the device that sent the original message.

In still other examples, adjusting the functionality of the device 98 may involve completely deactivating the functionality while the device 98 is in the adjusted operational mode. In these instances, both incoming and outgoing messages are prohibited, and thus no messages are actually transmitted to or from the device 98. When this type of adjustment to the device 98 is selected, a default message or pre-selected message may be transmitted in response to any messages that are attempting to be sent to the mobile device 98. For example, if all of the user's text messaging features are completely deactivated (i.e., the user cannot send or even receive messages), when another device attempts to transmit a text message to the user's device 98, the user's device 98 will block the message and reply with a text message saying "the customer you are trying to reach is not accepting messages at this time", "the user's device is currently unavailable", or the like.

In another aspect of the example method, upon establishing the RFID connection, the mobile device 98 automatically establishes a short range wireless connection with the telematics unit 14 so that the telematics unit 14 can control certain vehicle systems (or operations), step 804 in FIG. 8. When this occurs, the vehicle 12 is said to be placed into a preset operational mode. For instance, when the short range wireless connection is established, the telematics unit 14 may be able to identify the driver of the vehicle 12 utilizing identification information of the mobile device 98 by requesting such information from the device 98. This may be accomplished by comparing the mobile dialing number (MDN) of the device 98 with the user profile, which may contain a list of devices (identified by their respective MDNs) whose owners have been previously designated (e.g., by the subscriber, the owner of the vehicle 12, or other authorized person to make such designation) as being subject to a preset operational mode of the vehicle 12. For example, upon identifying the user of the vehicle 12 and/or recognizing the device 98, the telematics unit 14 (via a software program executable by the processor 36) may activate preset vehicle system modifications and/or vehicle component modifications which are set forth in the user profile as user-selected preferences. Examples of vehicle system modifications include a preset maximum vehicle speed, a preset maximum audio system volume, restricted radio stations, restricted audio system functions, preset geographic travel regions, occupant detection via seatbelt closure, and/or the like. If, for instance, the vehicle speed is restricted, upon activating the preset operational mode of the vehicle 12, then the vehicle 12 cannot exceed the preset maximum vehicle speed set forth in the user profile regardless of how much pressure the driver (i.e., the user) applies to the gas pedal. In another instance, if the radio stations are limited, then the user cannot access those restricted stations via the audio component 60. In this case, the user may set the radio portion of the audio component 60 to the desired but restricted radio station, but no sound will play through the speaker(s) 30, 30'.

It is to be understood that, as used herein, a "vehicle system" refers to any of the equipment/components or systems of the vehicle 12 identified above in conjunction with FIG. 1 that are in operative communication with the telematics unit 14. Thus, upon activating the preset operational mode, the telematics unit 14 can send signals to the appropriate equipment/components or systems of the vehicle 12 via the bus 34.

In some cases, when the preset operational mode of the vehicle 12 has been activated, an audible, visual, or tactile notice may be provided to the user inside the vehicle 12 that indicates that the operational mode has been activated. For instance, the notice may be played by the audio component 60 over the speaker(s) 30, 30', shown as a text message or icon on the display 80, manifested by vibrating the driver's seat or steering wheel, or the like. In some cases, the warning light 114 or another illumination device inside the vehicle 12 (e.g., an overhead light, an icon on the vehicle 12 dashboard, etc.) may be activated to notify the driver that the preset operational mode has been activated.

In instances where the notice is played via the audio component 60 or shown on the display 80, the notice may state something similar to "the vehicle is now operating in a preset operational mode", or the like. In some cases, the notice may also indicate what vehicle system(s) are being limited or controlled while the vehicle 12 is in the preset operational mode.

It is to be understood that the preset operational mode may be overridden by an authorized person by contacting the call center 24 and requesting a service to then-currently deactivate the operational mode setting. The call center 24, in response, will send a data message to the telematics unit 14 with instructions to restore the vehicle systems that were limited due to the preset operational mode. The deactivation of the preset operational mode may be accomplished for a single use (e.g., during the time at which the RFID connection is then-currently established) or permanently until the authorized person requests that the preset operation mode be reinstated.

Upon establishing the RFID connection between the RFID reader 119 attached to the device 98 and the tag 117 attached to the vehicle 12, the processor 101 may command the device 98 to generate a data message that contains information regarding the identity of the vehicle driver and a note that the vehicle 12 is then-currently in operation. This data message may be sent, e.g., as a text message, packet data, etc. to an outside entity identified from the user profile, as shown at step 806 in FIG. 8. For instance, the profile may indicate that all messages generated should be sent to the mobile device (see, e.g., 120 in FIG. 9) of the vehicle driver's father by associating the MDN of the driver's device 98 to that of the father's device 120. This data message may be used to apprise the driver's father that the vehicle 12 is being operated by the owner of the device 98 that is subject to being controlled by the instant example method.

It is contemplated herein to allow the outside entity to further control mobile communications of the user's mobile device 98 upon receiving the data message. So long as the outside entity is an authorized person/entity, the outside entity may, for example, initiate a voice or data connection with the call center 24, and once authorized, request that additional functionalities of the mobile device 98 be controlled. In response, the call center 24 may update the user profile and transmit the updated profile to the device 98 during a packet data session with the mobile device 98. The device 98 stores the updated profile in the memory 105 thereof, and may automatically apply the updated portions of the profile while then-currently controlling the device 98.

Examples of methods that may be used to transmit the data message to the outside entity will now be described hereinbelow in conjunction with FIG. 9. In one example, the outside entity may be the call center 24, and the data message may be communicated directly from the mobile device 98 to the call center 24 at step 900. This may be accomplished by initiating a data connection with the call center 24, and forwarding the message as packetized data to the call center 24. The message may be received and reviewed by an advisor 62, 62', the data aggregator 75, and/or the processor 84 at the call center 24.

In another example, the outside entity may be a facility 121 other than the call center 24 (such as a police station, a fire station, etc.) or may be the mobile device 120 of a family member or friend of the driver. In these examples, the device 98 may send the data message directly to the other facility 120 or 121 in human-readable form (e.g., as a text message, e-mail message, etc.) at step 902, or the call center 24 may forward the message received from the mobile device 98 to the other facility 120 or 121 using the communications module 86 at step 904. In instances where the data message is packetized, the call center 24, via the data aggregator 75 running appropriate programs, re-formats the packetized information so that the information is viewable or otherwise usable by the other facility 120 or 121.

In some cases, the data aggregator 75 at the call center 24 may automatically upload the data message as a post onto the host server 94 of the user's personal webpage 97. In other words, the call center 24 posts the information onto the user's webpage 97 at step 906. For instance, upon receiving the packetized message, the data aggregator 75 identifies the account associated with the mobile device 98 from which the message was sent. This may be accomplished by identifying the device 98 initiating the packet data session (e.g., via its MDN). Thereafter, the data aggregator 75 un-packetizes the message, and re-formats the message in the form of a post that may be uploaded onto the host server 94 of the user's webpage 97. The uploaded post may then be viewable by friends of the user's online networking group (i.e., those who have been authorized to access and view the user's webpage 97). Further, one or more of the user's friends may reply to the post by posting their responses, and in some instances a blog may be generated by the posts.

The data message may be posted, by the call center 24, in the form of a text post. Thus, in an example, the packetized information received by the data aggregator 75 is un-packetized, and re-formatted (via, e.g., software programs run by the data aggregator 75 or the processor 84 at the call center 24) so that the message is in a human-readable form. In another example, the information may be presented on the user's webpage 97 as an audio post. In this example, the message is un-packetized, re-formatted into text, and then converted from text to speech using a text-to-speech program run by the data aggregator 75 or the processor 84. The audio post may then be posted on the webpage 97 to be viewed (listened to) by the user's friends.

In some cases, the user may designate preferences, which are stored in his/her profile at the call center 24, and these preferences may include the preferred presentation of the text post and/or the audio post to be posted onto the user's webpage 97. These preferences may be established, by the user, by accessing a remotely accessible webpage 96 of the call center 24, and after submitting an appropriate login and password to access his/her account, selecting or inputting the user's preferences into the webpage 96. The preferences may also be established, by the user, by calling the call center 24, and after authenticating the user if necessary, the user may recite his/her preferences to an advisor 62, 62' during the voice call. The advisor 62, 62', who has access to the user's account, stores the user's preferences in the user profile during the call.

In yet another example shown in FIG. 9, the data message generated by the mobile device 98 may be transmitted to the telematics unit 14 using the short range wireless connection established between the devices 14, 98 at step 908. The telematics unit 14 may then forward the message to the outside entity (such as to other facility 121 or the other the mobile device 120 at step 910, to the call center 24 at step 912, etc.). In instances where the outside entity is the call center 24, this may be accomplished by initiating a vehicle data upload event with the call center 24 using a vehicle data upload (VDU) unit of the telematics unit 14, and transmitting the message as packetized data to the call center 24.

In further examples, the telematics unit 14 may also be utilized to upload the data message onto the host server 94 of the user's webpage 97 as a post, at shown at step 914 and/or to send the message to the mobile device 120 of a family member or friend of the driver (see again step 910). In either of these instances, the telematics unit 14 may re-format the message so that the message is in a human-readable form before uploading the message as a post and/or sending the message to the mobile device 120 of another person. Re-formatting may be accomplished utilizing appropriate software programs that are executable by the processor 36 of the telematics unit 14.

In yet a further example, the mobile device 98 may be configured to establish an Internet connection, and through this Internet connection, the mobile device 98 may be able to upload the data message directed onto the host server 94 of the user's webpage 97. This is shown at step 916 in FIG. 9.

In some cases, after the RFID connection has been established, the mobile device 98 may be configured to enter into a sleep mode after a predetermined amount of time of non-use. This sleep mode is basically a low power mode of the device 98, where certain, then-currently un-needed aspects of the device 98 (e.g., an LED light for the display screen, a GPS receiver, WiFi, BLUETOOTH®, etc.) are switched into a low-power consumption state. The sleep mode may be a user-selected mode included as a preference in the user profile. The user's profile may also include as a preference the predetermined amount of time of non-use of the device 98 in order to activate the sleep mode. The mobile device 98 may be woken up in response to a trigger, such as by physically moving the device (as detected, e.g., by an accelerometer disposed in the device 98) and/or attempting to use one or more functions associated with the device 98 (e.g., a button press).

As previously mentioned, the RFID connection established between the RFID reader 119 and the RFID tag 117 may be broken upon moving the device 98 (which has the reader 119 attached thereto) to a location inside or outside of the vehicle 12 so that the tag 117 falls outside of the RFID connection range. This may occur, for instance, whenever the device 98 is physically removed from the predefined location 100 inside the vehicle interior 102. As soon as the RFID connection is broken, the processor 101 of the device 98 receives a signal from the RFID reader 119 indicating that the RFID connection is broken. Upon receipt of this signal, the processor 101 recognizes that the mobile device 98 is no longer located at the predefined location 100. As soon as this recognition is made, the processor 101 automatically generates another data message indicating that the device 98 is no longer located in the predefined location 100. Transmission of the message may be accomplished via any of the methods previously described in conjunction to the data message sent to the outside entity when the RFID connection was established. It is believed that the transmission of the information to the outside entity when the RFID connection is broken may deter the vehicle driver (i.e., the owner/possessor of the mobile device 98) from using the device 98 while operating the vehicle 12.

Referring back to FIG. 8, in an example, upon detecting that the RFID connection is broken at step 808, the mobile device 98 establishes another short range wireless connection with the telematics unit 14 (unless one is already established), and transmits a request to the telematics unit 14 to activate another preset operational mode of the vehicle 12 at step 810. The other preset operational mode may be defined in the user profile stored in the memory 38 of the telematics unit 14, and may include further restrictions on various vehicle systems and/or components while the device 98 is not located in the predefined location 100. For instance, the preset operational mode for when the RFID connection is broken may include lowering the maximum allowable vehicle speed by at least 5 mph, 10 mph, etc., completely restricting any use of the in-vehicle radio, automatically illuminating vehicle headlights and tail lights, etc. It is to be understood that this preset operational mode will switch back to the previous preset operation mode as soon as the telematics unit 14 receives another message from the device 98 that another RFID connection has been established between the RFID reader 119 of the device 98 and the RFID tag 117 attached to the vehicle interior 102.

Additionally, upon detecting that the RFID connection is broken, the processor 101 of the device 98 may activate another portion of the application 103 responsible for adjusting a functionality of the device 98 at step 812. The functionality that is adjusted may be the same functionality that was previously adjusted upon establishing the RFID connection, but with further adjustments. For instance, if the text message creation function was restricted upon establishing an RFID connection so that texts may only be created verbally through the telematics unit 14, then upon breaking the RFID connection, the text message creation function may be completely restricted. In another example, additional functions of the mobile device 98 may be restricted upon breaking the RFID connection. For instance, if only the text message creation function was restricted upon establishing the RFID connection, then upon breaking the RFID connection, the text message creation function and the text message receiving function may both be restricted.

It is to be understood that the adjustments to the functionality of the mobile device 98 and/or the activation of the other preset operational mode of the vehicle 12 upon breaking the RFID connection occurs so long as the vehicle 12 is still in motion, or is still at or above the predefined vehicle speed. In instances where the vehicle speed is zero or the vehicle 12 has fallen below the predefined vehicle speed, then the processor 101 does not activate the portion of the application 103 responsible for controlling mobile communications. Further, the entire application 103 is de-activated as soon as the device 98 receives a signal from the telematics unit 14 that the vehicle transmission system has been placed into a park mode, and/or if the vehicle ignition system is turned into an OFF state.

It is further to be understood that the instant example method may be configured to send data messages each time an RFID connection is established and each time the RFID connection is broken, and this setting may be a default setting. In some cases, the data messages may be sent when the RFID connection is broken alone, and this setting may be selected by the user and stored in the user profile.

It is further to be understood that, as used herein, the singular forms of the articles "a," "an," and "the" include plural references unless the content clearly indicates otherwise, both in the specification and the claims.

Additionally, the term "any of" when used, for example, in conjunction with alternative method steps, as recited herein, refers to instances each step recited is performed alone, or in combination with one or more of the other steps recited. As one example, when the audio system is muted, the method may further include i) playing an audible warning message over the audio system 60, ii) displaying a text-based warning message on the display 80, iii) activating the warning light 114, iv) playing an audible warning message over the audio system 60 and displaying a text-based warning message on the display 80, v) playing an audible warning message over the audio system 60 and activating the warning light 114, vi) displaying a text-based message on the display 80 and activating the warning light 114, or vii) playing an audible warning message over the audio system 60, displaying a text-based message on the display 80 and activating the warning light 114.

While several examples have been described in detail, it will be apparent to those skilled in the art that the disclosed examples may be modified. Therefore, the foregoing description is to be considered non-limiting.

The invention claimed is:

1. A method for controlling mobile communications, comprising:
  establishing a radio frequency connection between i) a detector operatively disposed on or at a predefined location inside a cabin area of a vehicle and ii) a mobile communications device only when the mobile communications device is in or at the predefined location;
  by a telematics unit of the vehicle in communication with the mobile communications device, identifying a driver of the vehicle utilizing identification information of the mobile communications device, the driver being identified as an authorized user other than a vehicle owner;
  upon breaking the radio frequency connection, recognizing that the mobile communications device is no longer located in or at the predefined location inside the cabin area of the vehicle; and
  automatically sending a message directly to the vehicle owner, the message indicating that the mobile communications device is no longer located in or at the predefined location inside the cabin area of the vehicle.

2. The method as defined in claim 1 wherein the detector is a radio frequency identification (RFID) tag including identification information of the vehicle, and upon establishing the radio frequency connection, the method further comprises automatically adjusting a functionality of the mobile communications device via the application resident on the mobile communications device.

3. The method as defined in claim 2 wherein prior to automatically adjusting the functionality of the mobile communications device, the method further comprises:
  establishing a data connection between the mobile communications device and a facility;
  during the data connection, requesting a profile of the driver utilizing the vehicle identification information; and
  downloading the profile to the mobile communications device during the data connection;
  wherein the profile includes information pertaining to the adjusting of the functionality of the mobile communications device.

4. The method as defined in claim 2 wherein prior to automatically adjusting the functionality of the mobile communications device, the method further comprises:
  establishing a connection between the mobile communications device and the Internet; and
  while connected to the Internet, utilizing the identification information of the vehicle user to retrieve a profile of the vehicle owner from a remotely accessible page.

5. The method as defined in claim 2 wherein prior to establishing the radio frequency connection, the method further comprises:
  downloading a profile of the driver from any of an outside facility or a remotely accessible page to the mobile communications device; and
  utilizing the downloaded profile to adjust the functionality of the mobile communications device upon establishing the radio frequency connection.

6. The method as defined in claim 1 wherein after establishing the radio frequency connection and after a predetermined amount of time of non-use of the mobile communications device, the method further comprises enabling the mobile communications device to enter into a sleep mode.

7. The method as defined in claim 6 wherein after the mobile communications device enters into the sleep mode, the method further comprises waking up the mobile communications device in response to a trigger.

8. The method as defined in claim 1, further comprising playing an audible warning message in the vehicle or displaying a text-based warning message on an in-vehicle display unit in response to recognizing that the mobile communications device is no longer located at the predefined location inside the cabin area of the vehicle.

9. The method as defined in claim 1 wherein:
  the predefined location includes a mobile device holder operatively disposed inside the cabin area of the vehicle;
  the mobile device holder is selected from the group consisting of a vehicle door storage pocket, a tray formed in a center console of the vehicle, and a cup holder of the vehicle; and
  the detector is operatively attached to the mobile device holder.

10. A method for controlling mobile communications, comprising:
  establishing a radio frequency identification (RFID) connection between i) an RFID tag operatively disposed on or at a predefined location inside a cabin area of a vehicle and ii) an RFID reader operatively attached to a mobile communications device, wherein the RFID tag includes identification information of the vehicle;

upon establishing the RFID connection, establishing a short range wireless connection with a telematics unit operatively disposed in the vehicle;

downloading a profile of a vehicle user to the mobile communications device from one of i) the telematics unit, or ii) a telematics call center through the telematics unit;

via the application resident on the mobile communications device, utilizing the downloaded profile to adjust a functionality of the mobile communications device;

upon breaking the RFID connection, recognizing, by an application resident on the mobile communications device, that the mobile communications device is no longer located at the predefined location inside the cabin area of the vehicle; and automatically sending a message to an entity outside of the vehicle, the message indicating that the mobile communications device is no longer located at the predefined location inside the cabin area of the vehicle.

11. The method as defined in claim 10 wherein upon one of establishing or breaking the RFID connection, the method further comprises:

notifying the telematics unit that the mobile communications device is no longer located in the predefined location inside the cabin area of the vehicle; and in response to the notifying, via the telematics unit, activating a preset operational mode of the vehicle.

12. The method as defined in claim 11, further comprising:

identifying an operator of the vehicle upon establishing the short range wireless connection between the telematics unit and the mobile communications device; and selecting the preset operational mode of the vehicle based on the identification of the vehicle operator.

13. The method as defined in claim 11 wherein the preset operational mode of the vehicle includes any of a modification to an in-vehicle component or a vehicle system.

14. The method as defined in claim 10 wherein upon establishing the short range wireless connection, the method further comprises:

via the telematics unit, monitoring a then-current vehicle speed; and in response to a trigger, sending a data message from the telematics unit to the mobile device, the data message including a command to activate the adjusting of the functionality of the mobile communications device.

15. The method as defined in claim 10 wherein upon establishing the RFID connection, the method further comprises sending an other message to the outside entity, the other message indicating that the mobile communications device is located in or at the predefined location inside the cabin area of the vehicle.

16. The method as defined in claim 10 wherein the predefined location includes a mobile device holder operatively disposed inside the cabin area of the vehicle, and wherein the RFID tag is operatively attached to the holder.

17. A system for controlling mobile communications, comprising:

a mobile communications device to receive and send messages, the mobile communications device being associated with an operator of a mobile vehicle;

a radio frequency identification (RFID) reader operatively attached to the mobile communications device;

a location previously identified inside a cabin area of a vehicle, the location to receive the mobile communications device;

an RFID tag operatively attached to the location, the RFID tag to establish an RFID connection with the RFID reader when the mobile communications device is within an RFID reading range with the RFID tag;

an application resident on the mobile communications device to recognize that the mobile communications device is no longer located in the location when the RFID connection is broken;

an outside entity including a respective communications device to receive a message from the mobile communications device when the RFID connection is broken;

a telematics unit operatively disposed in the vehicle;

a short range wireless communications unit associated with the telematics unit and utilized, by the telematics unit, to establish a short range wireless connection with the mobile communications device; and a profile containing any of user-selected preferences or services stored in the telematics unit, the profile being downloaded to the mobile communications device upon establishing the short range wireless connection.

18. The system as defined in claim 17 wherein the mobile communications device includes a functionality that is adjustable via the application resident on the mobile communications device when the RFID connection is established.

19. The system as defined in claim 18, further comprising any of an outside facility or a remotely accessible page from which a profile of a vehicle user may be retrieved, by the mobile communications device, upon establishing the RFID connection.

20. The system as defined in claim 17, further comprising a vehicle speed sensor in selective and operative communication with the telematics unit, the vehicle speed sensor to generate vehicle speed data to be utilized by the telematics unit to determine when the vehicle has reached a predefined vehicle speed, wherein the telematics unit to send a data message to the mobile communications device that includes a command to activate an adjustment to the functionality of the mobile communications device upon making a determination that the vehicle has reached the predefined vehicle speed.

21. The system as defined in claim 20 wherein the telematics unit includes a processor including computer readable code encoded on a computer readable medium for activating a preset operational mode of the vehicle in response to receiving a notification, from the mobile communications device utilizing the short range wireless connection, that the RFID connection has been established.

22. The system as defined in claim 17 wherein the application resident on the mobile communications device includes:

computer readable code for enabling the mobile communications device to enter into a sleep mode after a predetermined amount of time of non-use of the mobile communications device has passed since establishing the RFID connection; and computer readable code for enabling the mobile communications device to wake up in response to a trigger.

23. The system as defined in claim 17 wherein the location is a mobile communications device holder operatively disposed inside the cabin area of the vehicle, and wherein the RFID tag is operatively attached to the holder.

* * * * *